(12) United States Patent
Tamagawa et al.

(10) Patent No.: US 6,888,961 B1
(45) Date of Patent: May 3, 2005

(54) PROFILE PRODUCING METHOD AND PROFILE PRODUCING APPARATUS

(75) Inventors: Kiyomi Tamagawa, Kanagawa (JP); Hirokazu Kondo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 558 days.

(21) Appl. No.: 09/709,514

(22) Filed: Nov. 13, 2000

(30) Foreign Application Priority Data

Nov. 11, 1999 (JP) ............................................. 11-320680
Nov. 11, 1999 (JP) ............................................. 11-320683

(51) Int. Cl.⁷ ................................................. G06K 9/00
(52) U.S. Cl. ........................ 382/162; 345/601; 358/518
(58) Field of Search ............................... 382/167, 166, 382/162; 345/601, 602, 600, 603, 604; 358/1.9, 518, 406, 504, 523

(56) References Cited

U.S. PATENT DOCUMENTS

| | | | | |
|---|---|---|---|---|
| 5,363,318 A | * | 11/1994 | McCauley | 702/85 |
| 5,694,227 A | * | 12/1997 | Starkweather | 358/504 |
| 5,999,703 A | * | 12/1999 | Schwartz et al. | 358/1.9 |
| 6,008,907 A | * | 12/1999 | Vigneau et al. | 358/1.9 |
| 6,075,888 A | * | 6/2000 | Schwartz | 382/167 |
| 6,141,120 A | * | 10/2000 | Falk | 358/504 |
| 6,522,778 B1 | * | 2/2003 | Tamagawa | 382/167 |
| 6,580,524 B1 | * | 6/2003 | Weichmann et al. | 358/1.9 |
| 2001/0043376 A1 | * | 11/2001 | Kumada et al. | 358/504 |

FOREIGN PATENT DOCUMENTS

| | | | | |
|---|---|---|---|---|
| JP | 10-126633 | 5/1998 | | H04N/1/60 |
| JP | 10-136219 | 5/1998 | | H04N/1/60 |

OTHER PUBLICATIONS

Kim Jin–Seo et al, Development of color management system prototype, IEEE International Conference on Systems, Man, and Cybernetics, Oct. 11–14, 1998, vol. 3, p 2529–2532.*

Machine translation and English abstract of JP 10–126633, May 15, 1998.*

* cited by examiner

*Primary Examiner*—Yon J. Couso
(74) *Attorney, Agent, or Firm*—Sughrue Mion, PLLC

(57) ABSTRACT

There are disclosed a profile producing method and a profile producing apparatus for producing a profile representative of the association between the colors on a color image and the color data in accordance with which the color image is outputted, in an output device such as a color printer and a printing machine for outputting color images in accordance with image data including color data. From among a plurality of existing profiles (tables), a suitable table is selected in accordance with an evaluation based on dot gains. A new profile is produced in accordance with the selected table and colorimetry data of a color chart involved in small number of patches.

24 Claims, 14 Drawing Sheets

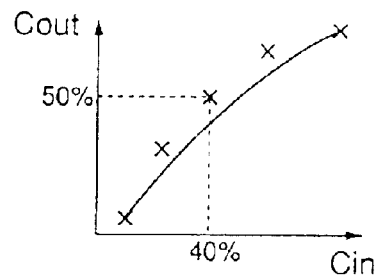
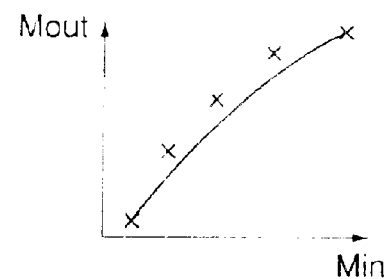
Fig. 13(A)  Fig. 13(B)
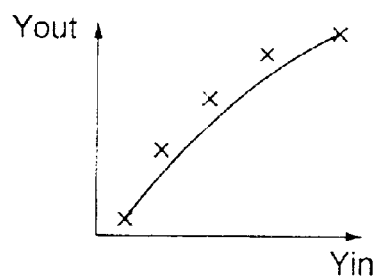
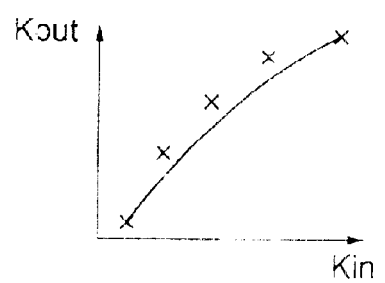
Fig. 13(C)  Fig. 13(D)
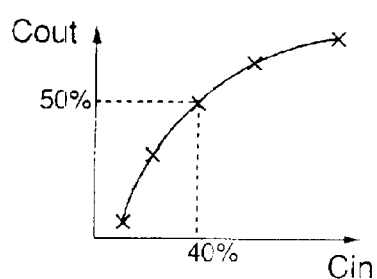
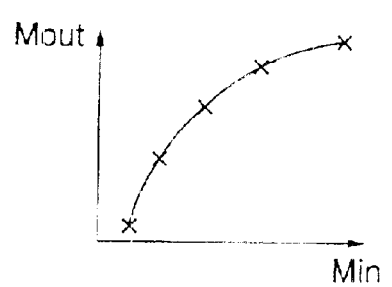
Fig. 14(A)  Fig. 14(B)
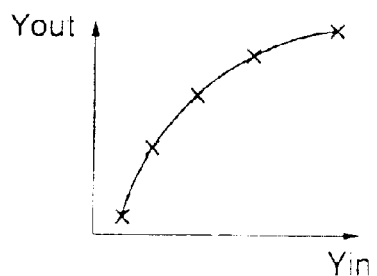
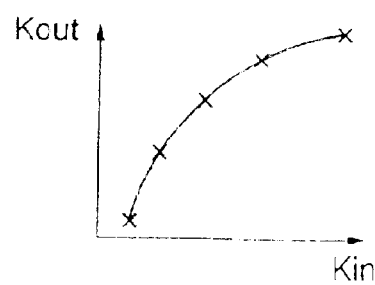
Fig. 14(C)  Fig. 14(D)

PROFILE PRODUCING METHOD AND PROFILE PRODUCING APPARATUS

BACKGROUND OF THE INVENTION

1. Field of the Invention

The present invention relates to a profile producing method and a profile producing apparatus for producing a profile representative of the association between the colors on a color image and the color data in accordance with which the color image is outputted, in an output device such as a color printer and a printing machine for outputting color images in accordance with image data including color data.

2. Description of the Related Art

Hitherto, it is widely performed that a color image is outputted by an output device such as a color printer and a printing machine in accordance with, for example, image data obtained through reading an original image by a color scanner and the like, and image data generated by a computer. At that time, when it is intended, for example, to output a color image which is very close in color to an original image before reading by a scanner, or to output a color image having a desired color representation, it is an important problem as to what color is reproduced on the color image in accordance with color data included in image data fed to the output device for outputting the color image. The association between the color data and the color on the color image outputted is referred to as a profile of the output device.

FIG. 19 is a flowchart useful for understanding the conventional method of producing a profile. Here, there will be explained, by way of example of the output device, a printing machine four printing a color image in accordance with image data including color data representative of dot % for four colors of cyan (C), magenta (M), yellow (Y) and black (K).

To produce the profile of the printing machine, for example, a computer is used to produce image data representative of a color chart consisting of a plurality of color patches associated with a plurality of sorts of color data obtained through sequentially varying dot % on each of four colors of C, M, Y, K (step e1 of FIG. 19), the image data thus produced are transmitted to the printing machine to print the color chart (step e2), and the printing machine produces a print sample of the color chart (step e3). Next, a plurality of color patches on the print sample of the color chart are subjected to a colorimetry by a calorimeter (step e4) to obtain the association (here, it is referred to as the "association M") between the color data transferred to the printing machine for output of the color chart and chromaticity values of XYZ values of XYZ color system determined by, for example, CIE, which chromaticity values are obtained through measurement of the color chart (step e5).

The association M between the color data and the chromaticity values is restricted in number of color patches constituting the color chart, and thus it is an association corresponding to the coordinate points rather rough and scattered on a color space. Therefore, such an association M is too rough to express the profile of the printing machine.

In view of the foregoing, in the next step e6, a table T representing the profile of the printing machine is produced in accordance with a computation (it is referred to as a "computation A") for producing a table including an interpolation arithmetic operation-processing and the like.

As the computation A, it is possible to preferably adopt a computation scheme, for example, as proposed in Japanese Patent Application Laid Open Gazette Hei. 10-126633, that the association between the color data and the chromaticity values, which corresponds to each of sides on a three-dimensional shape (corresponding to a cub in case of a three-dimension) defining an external form of an area (a color reproducing area) to be expressed by the printing machine, on CMYK color space, is determined, then the association between the color data and the chromaticity values, which corresponds to coordinate points on each surface encircled by a plurality of sides, is determined, and finally, the association between the color data and the chromaticity values, which corresponds to coordinate points inside the three-dimensional shape.

The use of the table (the profile) thus produced makes it possible to print a color image of a desired color representation using a printing machine.

To determine a profile of an output device through adoption of the above-mentioned method, there is a need to measure a color chart composed of a large number of color patches outputted from the output device. This is associated with such a problem that it takes a great deal of time. An adoption of the computation scheme, which is proposed in Japanese Patent Application Laid Open Gazette Hei. 10-126633, makes it possible to considerably reduce the number of color patches as compared with the earlier technology. However, even in the event that such a computation scheme is adopted, there is a need to output and measure hundreds of color patches in order to produce a table (a profile) excellent in precision.

As a method in which the above-mentioned problem is improved to allow the use of a small number of patches, Japanese Patent Application Laid Open Gazette Hei. 10-136219 proposes a technology that a table produced beforehand on a reference output condition is corrected in accordance with data obtained through colorimetry of a small number of color patches outputted on the correction output condition, so that a new table is produced.

However, according to the proposed technology in Japanese Patent Application Laid Open Gazette Hei. 10-136219, while it is possible to admire such an idea that an existing table produced beforehand is utilized. However, a precision of a table newly produced considerably depends on the existing table utilized for producing the new table. Further, according to the proposed technology in Japanese Patent Application Laid Open Gazette Hei. 10-136219, it is impossible to represent non-linear characteristics between the color data and the chromaticity values. Thus, also in this respect, it is a problem in the point of precision.

SUMMARY OF THE INVENTION

In view of the foregoing, it is an object of the present invention to provide a profile producing method and a profile producing apparatus for producing a profile, which is high in precision, using a color chart few in number of patches.

To achieve the above-mentioned object, the present invention provides a first profile producing method of producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing method comprising:

a color association definition obtaining step of obtaining a color association definition, in which distribution of coordinate points is relatively rough, defining an association between the first color data representative of coordinates on the first color space and the second color data representative of coordinates on the second color space;

a profile selection step of selecting a first profile from among a plurality of profiles, in which distribution of coordinate points is relatively close as compared with the color association definition obtained in said color association definition obtaining step, defining an association between the first color data representative of coordinates on the first color space and the second color data representative of coordinates on the second color space; and a profile producing step of producing a second profile defining an association between the first color data representative of coordinates on the first color space and the second color data representative of coordinates on the second color space, by correcting the first profile selected in said profile selection step in accordance with the color association definition obtained in said color association definition obtaining step.

In the first profile producing method according to the present invention as mentioned above, it is preferable that said color association definition obtaining step causes said output device to output a color chart composed of a plurality of color patches associated with coordinate points more roughly distributed as compared with a distribution of the coordinate points defined in association by said first profile, on the first color space, and measures the plurality of color patches constituting the color chart outputted from said output device to determine each of the second color data representative of each of the coordinates on the second color space, on each color patch, so that a color association definition, defining an association between the first color data representative of the coordinates on the first color space, wherein a distribution of coordinate points is more rough as compared with the first profile, and the second color data representative of coordinates on the second color space, is determined.

In the first profile producing method according to the present invention as mentioned above, it is preferable that said profile selection step determines on each of the plurality of profiles a first evaluation value for evaluating a difference between a dot gain quantity of the color association definition obtained in said color association definition obtaining step and a dot gain quantity of one of the plurality of profiles, and selects one of the plurality of profiles, which is smaller in an evaluated difference, as the first profile in accordance with the first evaluation value.

Selection of the profile close in dot gain as the first profile makes it possible to produce a second profile with great accuracy by correcting the first profile to be adapted to a color association definition determined from the color chart.

Further, in the first profile producing method according to the present invention as mentioned above, it is preferable that said profile selection step determines on each of the plurality of profiles a second evaluation value for evaluating a distance between coordinate points on the second color space, which are associated with identical coordinates on the first color space in accordance with the color association definition obtained in said color association definition obtaining step and one of the plurality of profiles, and selects one of the plurality of profiles, which is smaller in an evaluated distance, as the first profile in accordance with the second evaluation value.

Selection of the profile close in distance as the first profile also makes it possible to produce a second profile with great accuracy.

Furthermore, in the first profile producing method according to the present invention as mentioned above, it is preferable that said profile selection step determines on each of the plurality of profiles a first evaluation value for evaluating a difference between a dot gain quantity of the color association definition obtained in said color association definition obtaining step and a dot gain quantity of one of the plurality of profiles, and further, said profile selection step determines on each of the plurality of profiles a second evaluation value for evaluating a distance between coordinate points on the second color space, which are associated with identical coordinates on the first color space in accordance with the color association definition obtained in said color association definition obtaining step and one of the plurality of profiles, and selects one of the plurality of profiles, which is smaller in an evaluated difference and an evaluated distance, as the first profile in accordance with both the first evaluation value and the second evaluation value.

Selection of the first profile through evaluation of both the dot gain quantity and the distance makes it possible to select with greater accuracy a profile suitable as the first profile which is the base for producing a new second profile.

To achieve the above-mentioned object, the present invention provides a second profile producing method of producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing method comprising:

a profile obtaining step of obtaining a first profile defining an association between the first color data representative of coordinates on the first color space and the second color data representative of coordinates on the second color space;

a color association definition obtaining step of causing said output device to output a color chart including a plurality of color patches associated with coordinate points more roughly distributed as compared with a distribution of the coordinate points defined in association by said first profile, on the first color space, and measuring, of the plurality of color patches constituting the color chart outputted from said output device, the plurality of color patches associated with coordinate points more roughly distributed as compared with a distribution of the coordinate points defined in association by said first profile, to determine each of the second color data representative of each of the coordinates on the second color space, on each color patch, so that a color association definition, defining an association between the first color data representative of the coordinates on the first color space, wherein a distribution of coordinate points is more rough as compared with the first profile, and the second color data representative of coordinates on the second color space, is determined;

a curve arithmetic operating step of performing on each combination of each of a plurality of color axes of the first color space and each of a plurality of color axes of the second color space an arithmetic operation for determining a curve formed through coupling relatively small number of points extracted from the color association definition, which are plotted on a plane represented by a color axis of the first color space and a color axis of the second color space, while reflecting a non-linearity of a curve consisting of a relatively large number of points extracted from the first profile, which are plotted on the plane; and a profile producing step of producing a second profile defining an association between the first color data representative of coordinates on the first color space and the second color data representative of coordinates on the second color space in accordance with an assembly of curves formed through coupling points extracted from the color association definition obtained in said color association definition obtaining step.

With respect to the color association definition obtaining step, it is acceptable that the "color chart including a plurality of color patches associated with coordinate points more roughly distributed as compared with a distribution of the coordinate points defined in association by said first profile, on the first color space" itself is the color chart associated with coordinate points more roughly distributed as compared with a distribution of the coordinate points defined in association by said first profile, on the first color space, or alternatively, it is acceptable that while the color chart itself is not concerned with one "more roughly distributed as compared with a distribution of the coordinate points defined in association by said first profile, on the first color space", a colorimetry is performed on "a plurality of color patches associated with coordinate points more roughly distributed as compared with a distribution of the coordinate points defined in association by said first profile".

According to the second profile producing method of the present invention as mentioned above, to determine a curve formed through coupling data (second color data) obtained by the colorimetry, the curve arithmetic operating step determines the curve, while reflecting a non-linearity of the first profile. This feature makes it possible to produce the second profile with great accuracy reflecting a non-linearity of the first profile.

In the second profile producing method according to the present invention as mentioned above, it is preferable that said curve arithmetic operating step modifies on said each combination the curve consisting of a relatively large number of points extracted from the first profile in such a manner that relatively small number of points extracted from the color association definition are coupled with one another in accordance with a ratio of the second color data extracted from the color association definition, which corresponds to an identical first color data, and the second color data extracted from the first profile, so that an arithmetic operation for determining a curve formed through coupling relatively small number of points to one another is executed.

In the above-mentioned second profile producing method, it is preferable that said curve arithmetic operating step performs on said each combination a linear interpolation for the ratios associated with a plurality of first color data to determine each ratio associated with each value of the first color data, so that an arithmetic operation for moving points constituting a curve consisting of relatively large number of points extracted from the first profile is executed in accordance with the ratio.

The said curve arithmetic operating step in the second profile producing method of the present invention as mentioned above makes it possible to adopt the above-mentioned arithmetic operation method preferably. According to such an arithmetic operation method, it is possible to modify the curve consisting of relatively large number of points extracted from the first profile, reflecting a non-linearity of the curve.

In the above-mentioned second profile producing method, it is preferable that said profile obtaining step determines the first profile by correcting an existing third profile defining an association between the first color data representative of coordinates on the first color space and the second color data representative of coordinates on the second color space in such a manner that a dot gain on each color axis of the first color space is coincident with a dot gain on each color axis determined in accordance with the color chart outputted from said output device.

According to the present invention as mentioned above, the first profile is produced to meet the dot gain of the output device on the base of the existing third profile, and the new profile is produced in accordance with the produced first profile. This feature makes it possible to produce a profile with greater accuracy.

In the above-mentioned second profile producing method, it is preferable that said first color space is defined by color axes of four colors of cyan C, magenta M, yellow Y and black K, and said color association definition obtaining step adopts, as said color chart, a color chart composed of color patches corresponding to coordinate points not less than three points, which are designated on each axis coupling vertexes with one another of a cubic area capable of representing a color by said output device, of each sub-space where the first color space is divided into a plurality of sub-spaces defined by color axes of three colors of C, M, Y, which are associated with a plurality of discrete coordinate points on a color axis of K color, respectively, and causes said output device to output said color chart.

This feature makes it possible to reduce the number of necessary color patches and collect the same completely, and possible to produce a profile with great accuracy.

To achieve the above-mentioned object of the present invention, there is provided a profile producing apparatus for producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing apparatus comprising:

a color association definition obtaining section for obtaining a color association definition, in which distribution of coordinate points is relatively rough, defining an association between the first color data representative of coordinates on the first color space and the second color data representative of coordinates on the second color space;

a profile selection section for selecting a first profile from among a plurality of profiles, in which distribution of coordinate points is relatively close as compared with the color association definition obtained in said color association definition obtaining section, defining an association between the first color data representative of coordinates on the first color space and the second color data representative of coordinates on the second color space; and a profile producing section for producing a second profile defining an association between the first color data representative of coordinates on the first color space and the second color data representative of coordinates on the second color space, by correcting the first profile selected in said profile selection in accordance with the color association definition obtained in said color association definition obtaining section.

In the profile producing apparatus according to the present invention as mentioned above, it is acceptable that said profile selection section determines on each of the plurality of profiles a first evaluation value for evaluating a difference between a dot gain quantity of the color association definition obtained in said color association definition obtaining section and a dot gain quantity of one of the plurality of profiles, and selects one of the plurality of profiles, which is smaller in an evaluated difference, as the first profile in accordance with the first evaluation value.

In the profile producing apparatus according to the present invention as mentioned above, it is acceptable that said profile selection section determines on each of the plurality of profiles a second evaluation value for evaluating a distance between coordinate points on the second color space, which are associated with identical coordinates on the first color space in accordance with the color association definition obtained in said color association definition obtaining section and one of the plurality of profiles, and selects one of the plurality of profiles, which is smaller in an evaluated distance, as the first profile in accordance with the second evaluation value.

In the profile producing apparatus according to the present invention as mentioned above, it is acceptable that-said profile selection section determines on each of the plurality of profiles a first evaluation value for evaluating a difference between a dot gain quantity of the color association definition obtained in said color association definition obtaining section and a dot gain quantity of one of the plurality of profiles, and further, said profile selection section determines on each of the plurality of profiles a second evaluation value for evaluating a distance between coordinate points on the second color space, which are associated with identical coordinates on the first color space in accordance with the color association definition obtained in said color association definition obtaining section and one of the plurality of profiles, and selects one of the plurality of profiles, which is smaller in an evaluated difference and an evaluated distance, as the first profile in accordance with both the first evaluation value and the second evaluation value.

In the profile producing apparatus according to the present invention as mentioned above, it is preferable that said profile selection section comprises a display for displaying a color association definition obtained by said color association definition obtaining section and a graph showing a change of dot gain quantity of said plurality of profiles, and an operating section for selecting a desired profile from among said plurality of profiles as the first profile, and wherein said profile selection section selects the first profile in accordance with an operation of said operating section.

To select the first profile, it is acceptable that an operator selects the first profile in accordance with information as to the dot gain received.

BRIEF DESCRIPTION OF THE DRAWINGS

FIGS. 13(A)–(D) are views each showing the association (x marks) between dot % on data determined from a color chart and dot % taking into consideration a dot gain, and the association (a curve) between dot % data on a table T0 typically shown in FIG. 12 and dot % taking into consideration a dot gain.

FIGS. 14(A)–(D) are views each showing a curve after correction made in such a manner that a dot gain determined from the table is coincident with a dot gain determined from the color chart.

DETAILED DESCRIPTION OF PREFERRED EMBODIMENTS

Embodiments of the present invention will be described with reference to the accompanying drawings.

Figure 1:
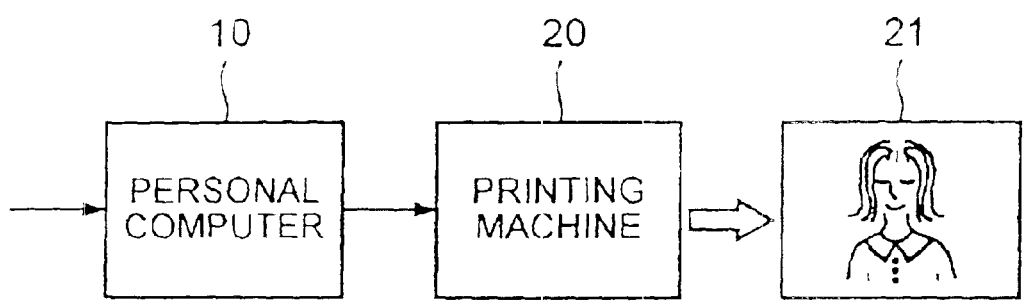
FIG. 1 is a schematic constitution view of an image output system.

FIG. 1 is a schematic constitution view of an image output system.

FIG. 1 shows a personal computer 10 and a printing machine 20.

The personal computer 10 receives image data obtained through reading an image by a color scanner (not illustrated) for instance, and image data obtained through photography by a digital still camera (DSC). Or alternatively, it is possible to cause the personal computer 10 to generate, for example, image data for a color chart. Image data fed to the personal computer 10 is converted inside the personal computer 10, when it is intended that an image based on the image data is outputted from the printing machine 20, into image data representative of the respective dot % of CMYK suitable for the printing machine 20.

To perform such a conversion, a profile involved in the printing machine 20, which is representative of the association between color data to be transmitted to the printing machine 20 and colors (chromaticity values) on a color image to be printed and outputted by the printing machine 20, is referred to so as to perform a conversion in such a manner that a color image 21 having a desired color representation is printed and outputted by the printing machine 20. Here, a color representation on a color image is noticed. Such a conversion as to colors is referred to as a "color conversion".

While FIG. 1 shows the printing machine 20 by way of example of the output device, the output device is not restricted to a printing machine, but it is acceptable that the output device is, for example, a color printer. Also in the event that the color printer is adopted as the output device, it is acceptable that the color printer is an electrophotographic scheme of color printer, an ink jet scheme of color printer, or a printer of such a scheme that a printing paper is exposed with a modulated laser beam and then developed. Further, it is acceptable that the output device is an image display unit such as a CRT display unit and a plasma display unit for displaying an image on a display screen. Here, the explanation will be continued taking the printing machine 20 by way of example.

Figure 2:
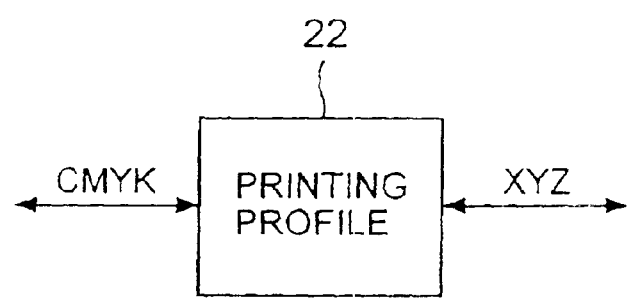
FIG. 2 is a conceptual view of a profile of a printing machine shown in FIG. 1.

FIG. 2 is a conceptual view of a profile of the printing machine 20 shown in FIG. 1.

A printing profile 22 is representative of color reproduction characteristics of the printing machine 20, and is referred to as a printing profile. The printing profile 22 represents the association between the color data (here it is color data representative of the respective dot % of CMYK, and in some case, it is referred to as "CMYK data") after color conversion by the personal computer 10 and chromaticity values (here XYZ values) representative of colors on an color image to be printed and outputted in accordance with the color data. According to the present embodiment, a color space defined by color axes of CMYK corresponds to the first color space referred to in the present invention. A color space for defining chromaticity values (XYZ values) corresponds to the second color space, which is independent of devices, referred to in the present invention. Accordingly, in the present embodiment, the CMYK data corresponds to the first color data referred to in the present invention, and color data (in some case, it is referred to as "XYZ data") representative of XYZ values corresponds to the second color data referred to in the present invention.

Referring to the printing profile 22 makes it possible to know what color of printed matter is obtained when what CMYK data is fed to the printing machine 20.

The printing profile 22 is varied for each printing machine of course, but is varied in accordance with a type of a printing machine and a printing condition for the same printing machine, such as a sort of ink to be used and a sort of printing paper to be used.

Here, there will be described the "second color space, which is independent of devices", referred to in the present invention.

With respect to the second color space, while it is explained in the above that the XYZ color space is an example of the second color space, there is no need that the second color space is the XYZ color space. Any one is acceptable, as the second color space, which is defined in such a manner that it is independent of a specified device. For example, it is acceptable that the second color space is L*a*b* color spaces (CIELAB color spaces), or alternatively it is acceptable that the second color space is a coordinate system clearly defined in such a manner that coordinate points on the color spaces are associated with the color spaces one by one. As an example of such a coordinate system, there is a standard RGB signal defined as follows.

$$\begin{bmatrix} R_{sRGB} \\ G_{sRGB} \\ B_{sRGB} \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

Assuming that $R_{8bit}$ denotes one wherein $R_{sRGB}$ is expressed by 8 bits, the following expression is given.

$R_{8bit} = 255 \times 12.92 R_{sRGB} (0 < R_{sRGB} < 0.00304)$ $R_{8bit} = 255 \times 1.055 R_{sRGB}^{(1.0/2.4)} - 0.055 (0.00304 \leq R_{sRGB} \leq 1)$ Also as to $G_{8bit}$ and $B_{8bit}$ wherein $G_{sRGB}$ and $B_{sRGB}$ are expressed by. 8 bits, respectively, similarly, $G_{8bit}$ bit and $B_{8bit}$ bit can be converted from $G_{sRGB}$ and $B_{sRGB}$, respectively.

Alternatively, it is acceptable that a color space defined by cmy density of a reversal film is adopted as a common color space. According to the present embodiment, a color space defining the chromaticity values (XYZ data) will be explained as the second color space.

The personal computer 10 shown in FIG. 1 corresponds to an embodiment of a profile producing apparatus of the present invention, and is used in part of an embodiment of a profile producing method of the present invention. Thus, first, there will be explained the personal computer 10 hereinafter.

Figure 3:
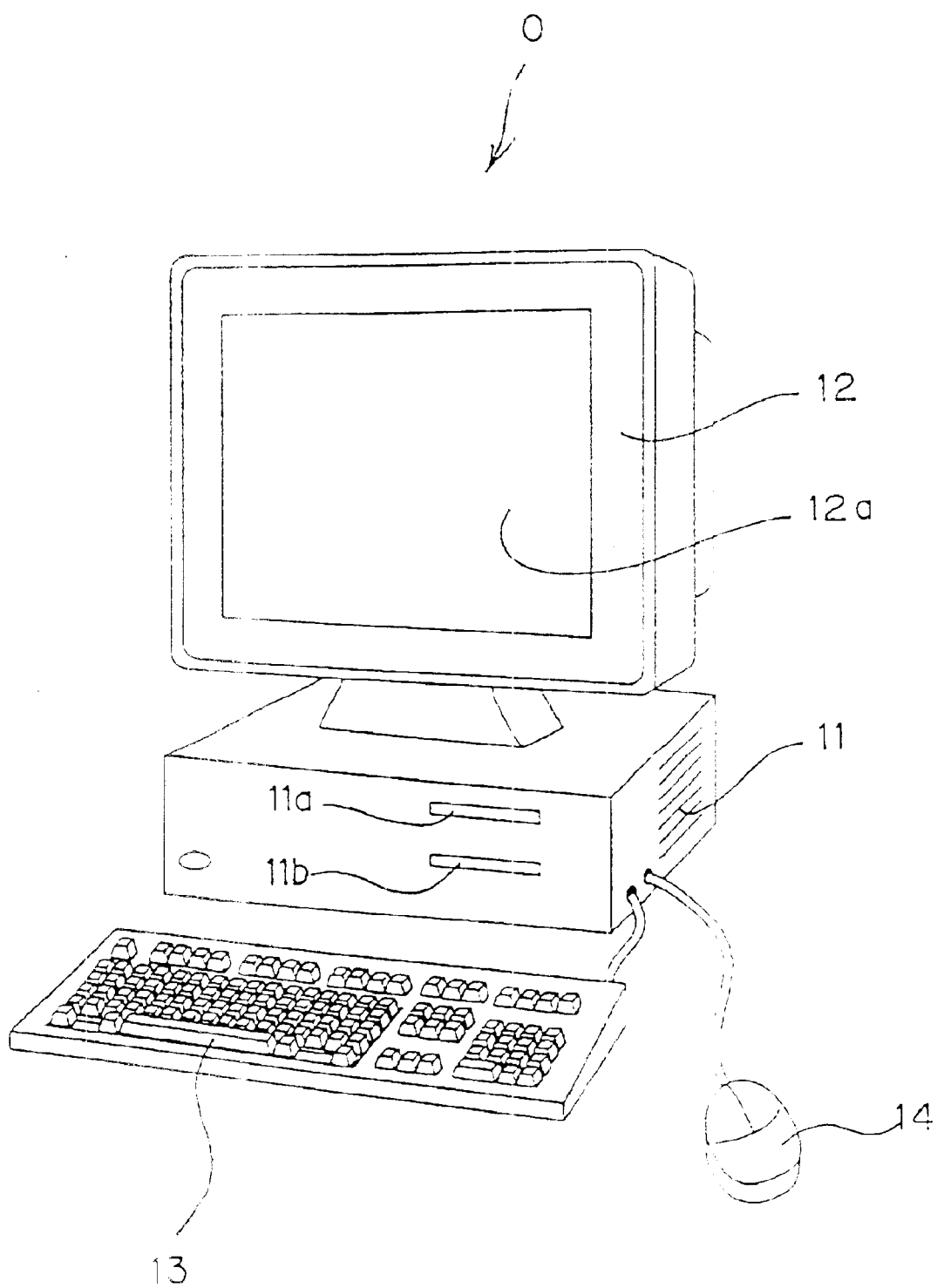
FIG. 3 is a perspective view of a personal computer.
Figure 4:
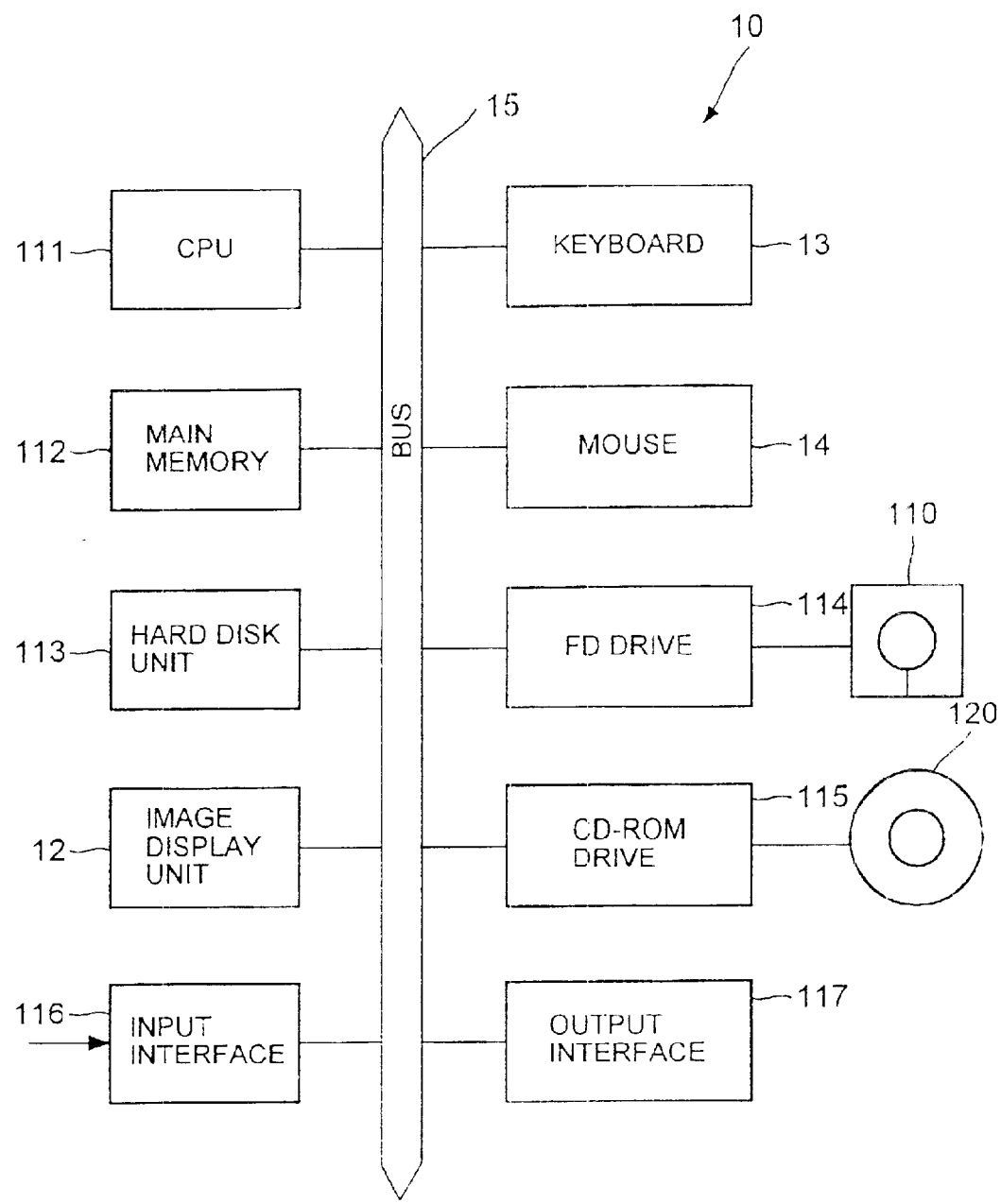
FIG. 4 is a hardware structural view of the personal computer shown in FIG. 1.
Figure 10:
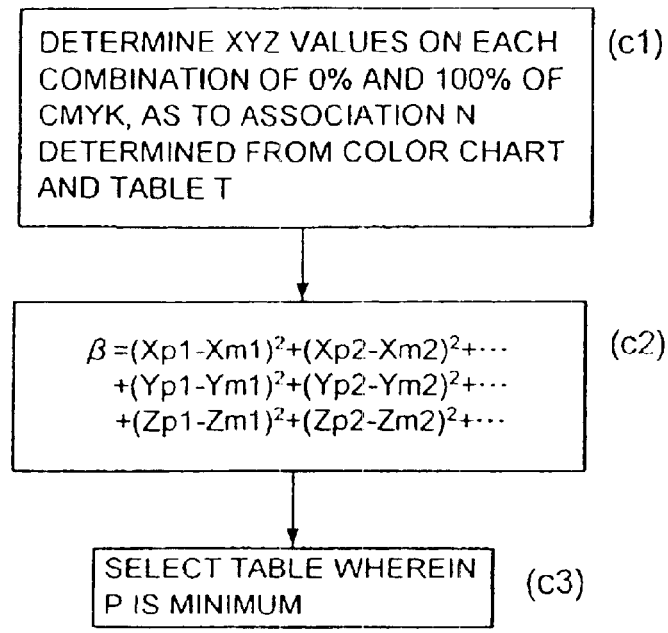
FIG. 10 is a flowchart useful for understanding a second example of step a20 of FIG. 5.

FIG. 3 is a perspective view of the personal computer 10 shown in FIG. 10 with one block. FIG. 4 is a hardware structural view of the personal computer 10.

The personal computer 10 comprises, on an external appearance, a main frame unit 11, an image display unit 12 for displaying an image on a display screen 12a in accordance with an instruction from the main frame unit 11, a keyboard 13 for inputting various sorts of information to the main frame unit 11 in accordance with a key operation, and a mouse 14 for inputting an instruction according to, for example, an icon and the like, through designation of an optional position on the display screen 12a, the icon and the like being displayed on the position on the display screen 12a. The main frame unit 11 has a floppy disk mounting slot 11a for mounting a floppy disk, and a CD-ROM mounting slot 11b for mounting a CD-ROM.

The main frame unit 11 comprises, as shown in FIG. 4, a CPU 111 for executing a various types of program, a main memory 112 in which a program stored in a hard disk unit 113 is read out and developed for execution by the CPU 111, the hard disk unit 113 for saving various types of programs and data, an FD drive 114 for accessing a floppy disk 110 mounted thereon, a CD-ROM drive 115 for accessing a CD-ROM 120 mounted thereon, an input interface 116 connected to an input device for inputting an image, for example, a color scanner (not illustrated) and a digital still camera (not illustrated), to receive image data from the input device, and an output interface 117 connected to the printing machine 20 (cf. FIG. 1) to transmit image data to the printing machine 20. These various types of elements are connected via a bus 15 to the image display unit 12, the keyboard 13 and the mouse 14.

The CD-ROM 120 stores therein a program for causing the personal computer 10 to operate as a profile producing apparatus. The CD-ROM 120 is mounted on the CD-ROM drive 115 so that the program, which is stored in the CD-ROM 120, is up-loaded on the personal computer 10 and is stored in the hard disk unit 113.

Next, there will be described a method of producing a profile.

Figure 5:
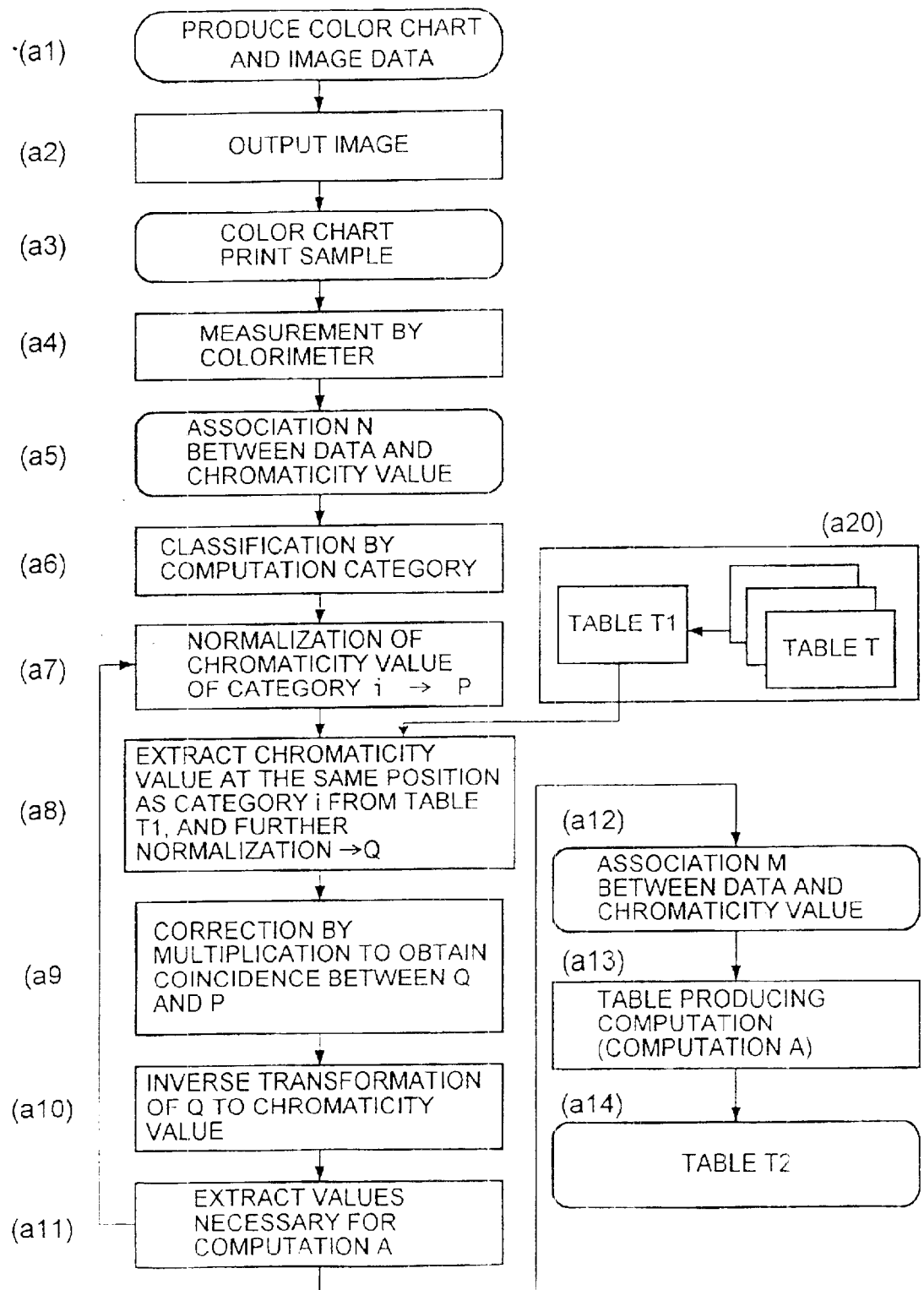
FIG. 5 is a flowchart useful for understanding an embodiment of a first profile producing method according to the present invention.

FIG. 5 is a flowchart useful for understanding an embodiment of a first profile producing method according to the present invention.

First, in step a1, the personal computer 10 shown in FIG. 1 is used to produce image data representative of a color chart consisting of a plurality of color patches associated with a plurality of sorts of CMYK data wherein dot % is sequentially varied on each of four colors of C, M, Y, K. The image data thus produced is transferred to the printing machine 20 to output a color chart (step a2). In step a3, a print sample of the color chart is obtained. The steps up to here are similar to the steps concerning the earlier technology explained referring to FIG. 19. However, according to the present embodiment, it is possible to greatly reduce the number of color patches constituting the color chart outputted from the printing machine 20 as compared with the earlier technology. A way of selection of CMYK data for outputting the color chart will be described later.

In step a4, in a similar fashion to that of the earlier technology, the color patches constituting the print sample of the color chart printed by the printing machine 20 are measured by a colorimeter to obtain XYZ data on each color patch. Thus, in step a5, there is obtained the association N between CMYK data and XYZ data. The association N is less in the number of pairs of the associated CMYK data and XYZ data as compared with the association M obtained in step e5 in the flowchart shown in FIG. 19. In other words, the association N is an association corresponding to scattered coordinate points on the color space. According to the present embodiment, the association N corresponds to the color association definition referred to in the first profile producing method of the present invention, and the steps a1 to a5 correspond to the color association definition obtaining process referred to in the first profile producing method of the present invention.

Figure 6:
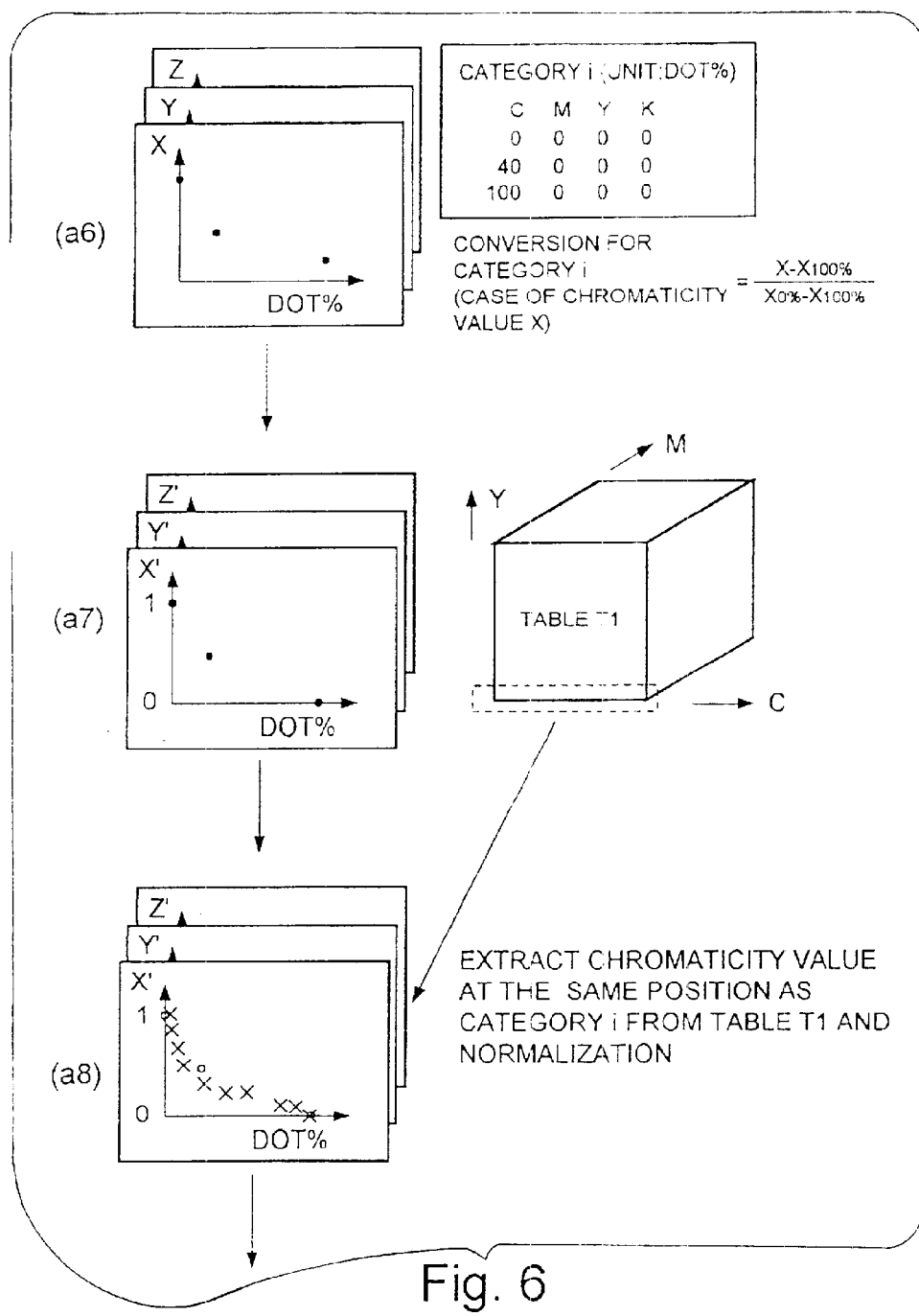
FIG. 6 is an illustration useful for understanding processes of steps a6 to a8 of FIG. 5.
Figure 7:
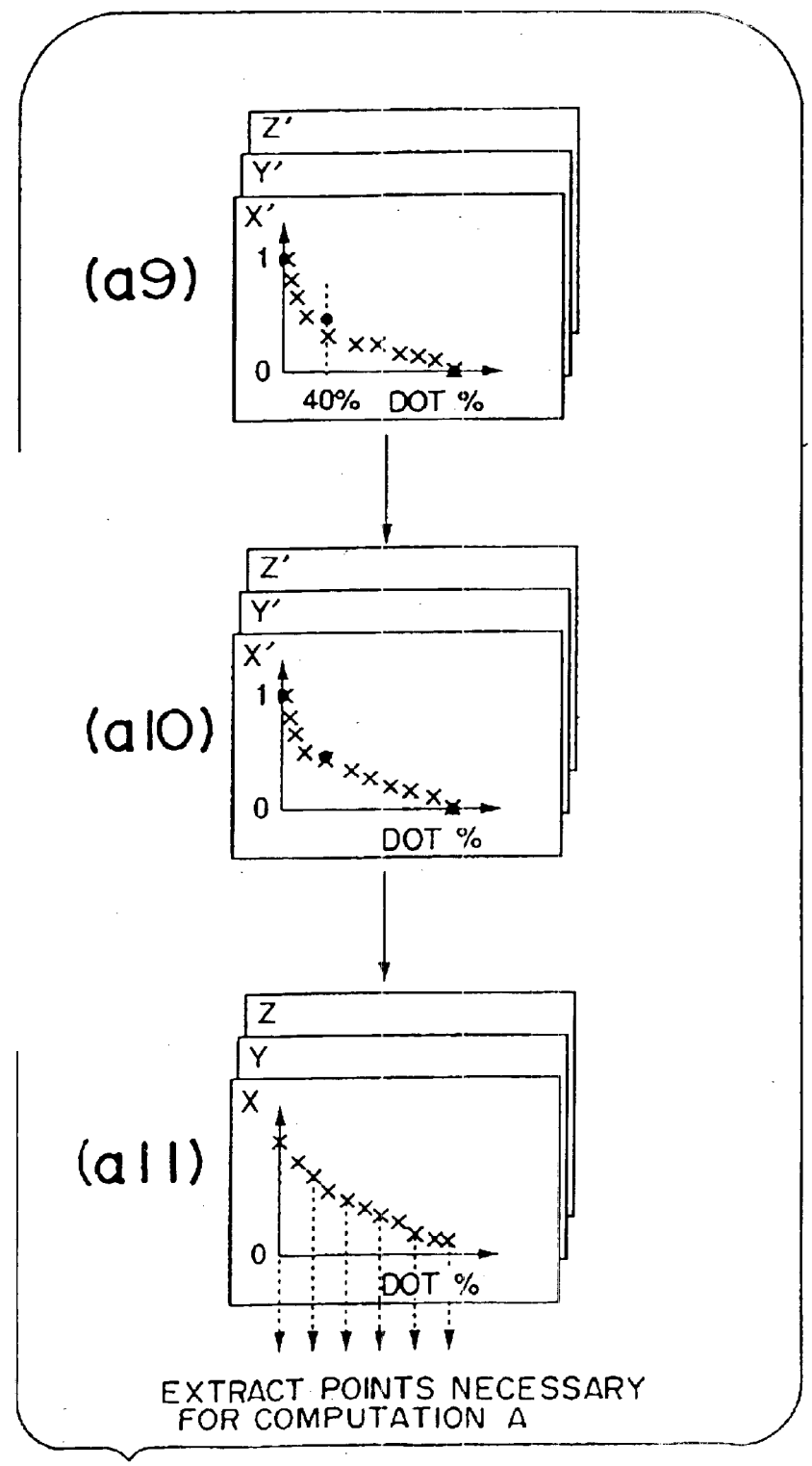
FIG. 7 is an illustration useful for understanding processes of steps a9 to a11 of FIG. 5.

FIG. 6 is an illustration useful for understanding processes of steps a6 to a8 of FIG. 5. FIG. 7 is an illustration useful for understanding processes of steps a9 to all of FIG. 5.

In step a6, after determination of the association through the steps a1 to a5, the determined associations N are classified by computation category.

Here, the associations N are classified by computation category, for example assembly of data associated with coordinate points on C axis, and assembly of data associated with coordinate points on M axis. Details of the computation category will be described later together with an explanation of a way of selection of CMYK data for outputting the color chart.

Part (a6) of FIG. 6 shows, by way of a typical example of a number of computation categories, a category i consisting of assembly of data associated with coordinate points on C axis, that is, assembly of data wherein all M, Y and K are 0%, and C is 0%, 40% and 100%. The horizontal axis of part (a6) of FIG. 6 denotes dot % of cyan (C), and the vertical axis denotes chromaticity values (here values of X, Y and Z of XYZ data). Each of graphs shown in parts (a6), (7) and (8) of FIG. 6, and parts (a9) to (all) of FIG. 7 corresponds to a plane represented by one color axis of the first color space (CMYK space) referred to in the present invention and one color axis of the second color space (XYZ space) referred to in the present invention.

In part (a6) of FIG. 6, there are plotted data (only X data is exemplarily shown) on X, Y, Z for CMYK data of (C, M, Y, K)=(0%, 0%, 0%, 0%,), (40%, 0%, 0%, 0%,), (100%, 0%, 0%, 0%,), on planes defined by C axis in the horizontal axis and axes of X, Y, Z in vertical axis.

In step a7 shown in FIG. 5, as shown in part (a7) of FIG. 6, chromaticity values (data on X, Y, Z) represented by the graph shown in part (a6) of FIG. 6 are normalized to be 0.0–1.0. This normalization is typically expressed, regarding for example, chromaticity value X, by the following formula.

$$X'=(X-X_{100})/(X_0-X_{100}) \quad (1)$$

X': normalized chromaticity value X
X: chromaticity value X before normalization
$X_0$: chromaticity value X where dot % is 0%
$X_{100}$: chromaticity value X where dot % is 100%.

The normalization is performed in accordance with the equation (1). The normalized value is expressed by a value P.

Part (a7) shows a graph wherein the normalized chromaticity value X' is plotted.

In step a8 shown in FIG. 5, chromaticity values on the color axis, which is the same as category i, are extracted from a table T1 and normalized.

FIG. 6 shows graphs each consisting of C axis and X axis, wherein chromaticity values on the C axis of the table T1 are extracted and normalized in accordance with the equation (1). The values thus extracted from the table T1 and normalized are referred to as a value Q. A graph of part (a8) of FIG. 6 shows the values Q (x marks) obtained from the table T1 as well as the values P (o marks) shown in part (a7) of FIG. 6.

The table T1 is one table selected among from a plurality of existing tables (printing profiles) produced under a various types of printing conditions, of the printing machine 20. The selected table is associated with a printing condition different from the printing condition involved in the table (printing profile) to be produced now. In step a20 shown in FIG. 5 is a process (an example of the profile selection process referred to in the first profile producing method of the present invention) of selecting the table T1 among from a plurality of existing table. Details of explanation of the step a20 will be described later. The explanation will be continued assuming that one table T1 is selected among from a various types of existing tables T (printing profiles) associated with a various types of printing conditions, of the printing machine 20.

In step a9 of FIG. 5, the value Q is corrected in such a manner that the value Q is multiplied by a factor so that the values Q (x marks shown in part (a9) of FIG. 7) are coincident with the values P (O marks) shown in part (a9) of FIG. 7. The method of correction will be explained referring to the part (a9) of FIG. 7.

Here, there are values P where dot % is 0%, 40% and 100%. The value P (and the value Q) at 0% and the value P (and the value Q) at 100% are normalized into 1.0 and 0.0, respectively. Here, the ratio of the value P and the value Q at 40%: k40=P/Q is determined.

Next, a factor k is determined for each dot %, so that k·Q is determined for each dot %.

That is, in the range of 0% to 40% in dot %, the ratio at 0%: k0=0 and ratio at 40%: k40=, (P/Q at 40%) are subjected to a linear interpolation to determine the ratio k for each dot % so that k·Q is determined for each dot %.

For example, with respect to 20% in dot %, k20=k 40×20/40=0.5·k40 and with respect to 10% in dot %, k10× 40×10/40=0.25·k40 are given.

Also in the range of 40% to 100% in dot %, the ratio of k40 and the ratio of k100=0 at 100% are subjected to a linear interpolation to determine the ratio k for each dot % so that k·Q is determined for each dot %. For example, with respect to 60%, k60=k40×(100−60)/(100−40)=(2/3)·k40

Thus, a correction of the value Q makes it possible to obtain a curve (x marks) coincident with the value P (O marks), as shown in part (a10) of FIG. 7. The curve (x marks) is coincident with the value P (O marks), and reflects a nonlinearity which is possessed by a curve composed of the original values Q (cf. part (a9) of FIG. 7) before correction, that is, a nonlinearity of the table T1 (cf. part (a8) of FIG. 6) from which the values Q are extracted.

The corrected values Q thus determined are normalized into 0.0 to 1.0. Thus, the corrected values Q are returned to the chromaticity value X (or Y, Z), as shown in part (a11) of FIG. 7, in accordance with the inverse transformation of the formula (1), that is, the following formula (2) (step a10 of FIG. 5).

$$X = x_{100} + (X_0 - X_{100}) \cdot X' \quad (2)$$

X: value Q after inverse transformation $X_0$: value P before normalization according to the formula (1) where dot % is 0%

$X_{100}$: value P before normalization according to the formula (1) where dot % is 100%

X': corrected value Q.

Next, in step a11 of FIG. 5, values necessary for a table producing computation (computation A) in step a13 of FIG. 5 are extracted from the curve (x marks of the part (a11) of FIG. 7) of the chromaticity values thus determined, so that the association M between the color data (CMYK data) and the chromaticity values (XYZ data) is produced. This association M corresponds to the association M which is produced in the step e5 of the method of producing the profile shown in FIG. 19, but is different in the point that the former association M is produced using colorimetry data of a small number of color patches and the existing table T1.

Figure 19:
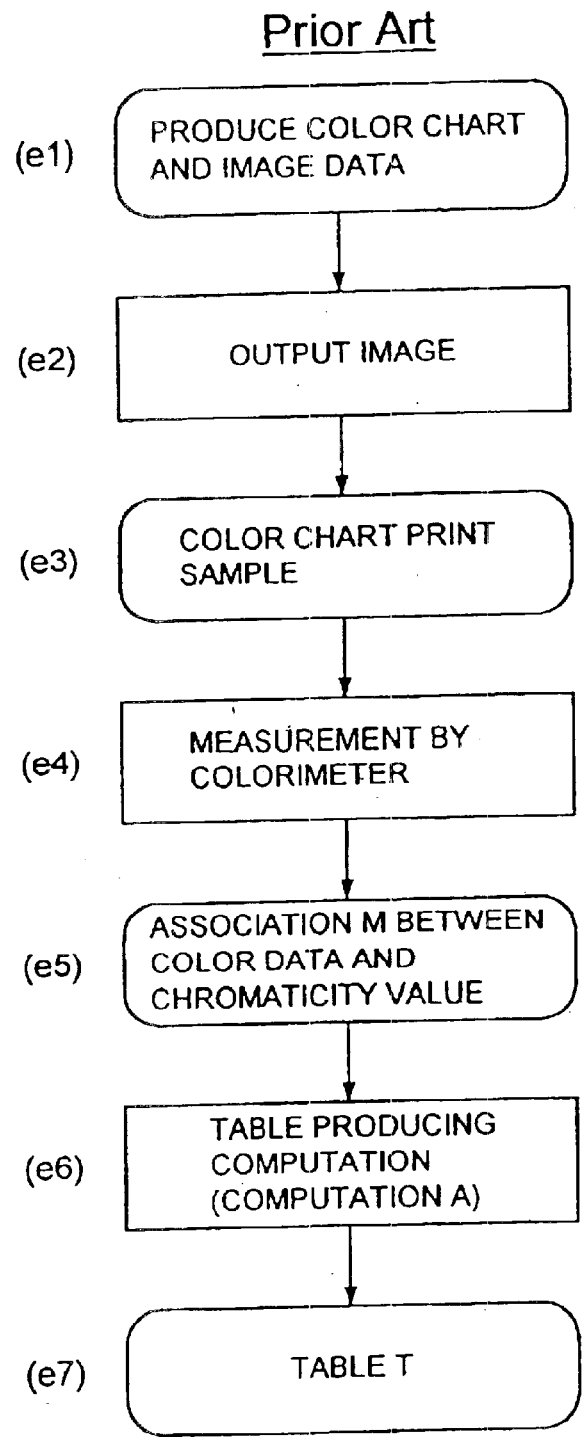
FIG. 19 is a flowchart useful for understanding the conventional method of producing a profile.

According to the method explained referring to FIG. 19, a color chart composed of a large number of color patches is outputted to measure the large number of color patches so that the association M is obtained. On the other hand, according to the present embodiment shown in FIG. 5, a color chart composed of less color patches is outputted to measure a small number of color patches so that the association M (cf. step a5 of FIG. 5) is produced, and the arithmetic operation using the table T1 makes it possible to produce the association M which is larger in scale (large number in the associated parameters) than the association N, while reflecting a nonlinearity of the table T1. Thus, according to the present embodiment, it is possible to reduce the number of color patches constituting a color chart and thereby saving the trouble of colorimetry. And reflecting the nonlinearity of the table T1 makes it possible to produce the association M with greater accuracy as compared with the association M produced by a actual measurement according to the method of FIG. 19.

In step a13 of FIG. 5, the same computation (computation A) as the step e6 of the method shown in FIG. 19 is executed in accordance with the association M, so that the table T2 (corresponding to an example of the second profile referred to in the present invention) of interest is produced.

According to the present embodiment, the process of the steps a6 to a14 corresponds to the profile producing process referred to the first profile producing method of the present invention.

Incidentally, according to the present embodiment, the computation A is executed after the association M is produced once. The reason why this is to do so is that the computation program, which performs the computation A adopted also in the method of FIG. 19, is utilized as it is. However, there is no need to always adopt part of the conventional method, it is acceptable that the table T2 is computed directly from the curve (x marks of part (a11) of FIG. 7) of the chromaticity values determined from the step a11 of FIG. 5.

Next, there will be described an embodiment of the profile selection process referred to the first profile producing method of the present invention, which profile selection process is shown in the step a20 of FIG. 5.

Figure 8:
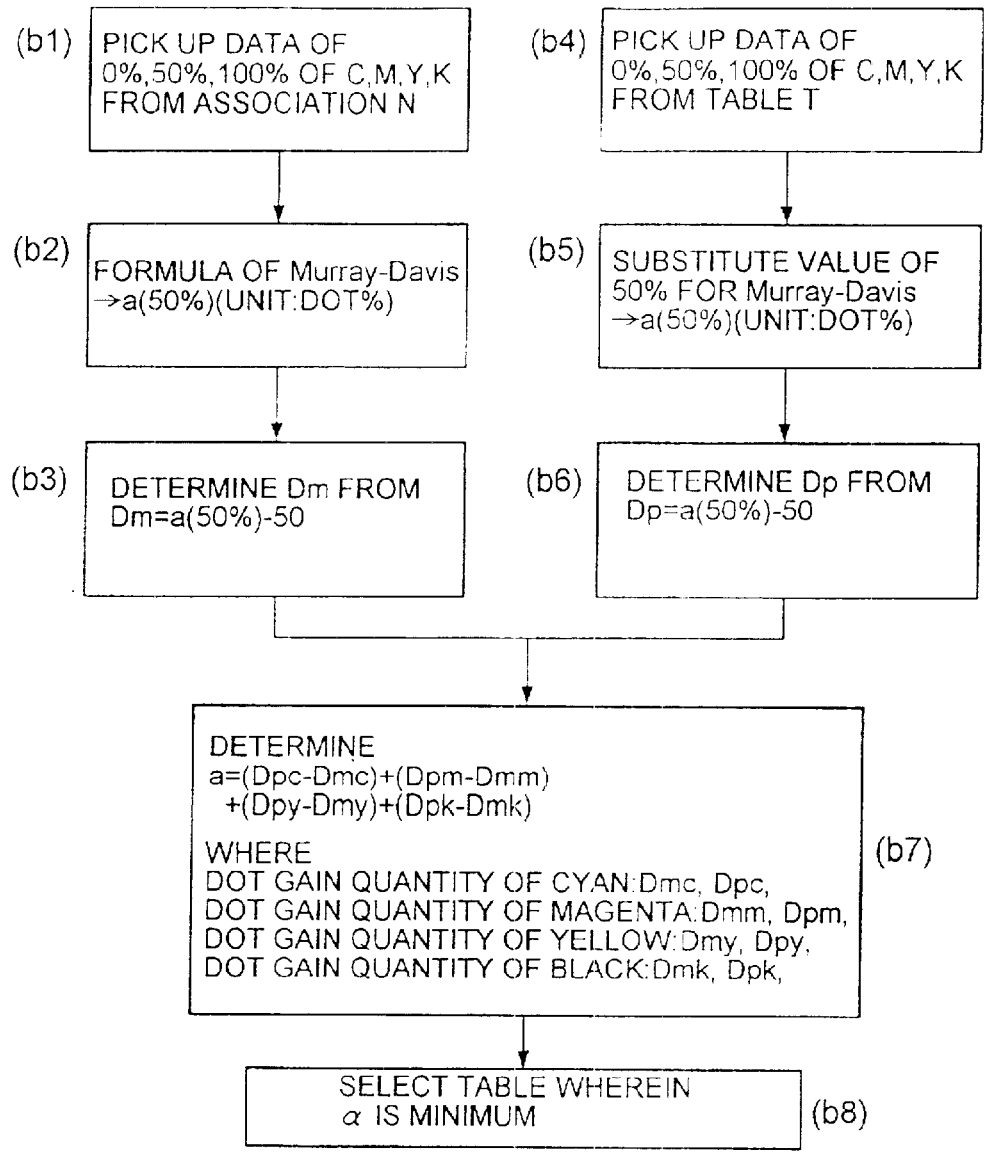
FIG. 8 is a flowchart useful for understanding a first example of step a20 of FIG. 5.

FIG. 8 is a flowchart useful for understanding a first example of the step a20 of FIG. 5.

In step b1 of FIG. 8, from the association N between data (CMYK data) and the chromaticity values (XYZ data), which is obtained through colorimetry of the outputted color chart, data on 0%, 50% and 100% of monochromatic gradation (on color axis of each of C, M, Y and K in CMYK color space) of each of C, M, Y and K are picked up. In step b2, dot % (50%) taking into consideration the dot gain, involved in 50% in dot % on data, is determined on each of C, M, Y and K in accordance with the formula (3) of Murray-Davis.

To determine dot % taking into consideration the dot gain, it is assumed that X is used as the chromaticity value, then dot % may be is determined in accordance with the following formula (3).

$$\alpha = \{(1-10^{-(X-X_0)})/(1-10^{-(X_{100}-X_0)})\} \times 100 \quad (3)$$

a: dot % taking into consideration the dot gain

X: chromaticity value (at 50% in dot %)

$X_0$: chromaticity value of the ground of the printing paper where the printing is made with data wherein dot % is 0%

$X_{100}$: chromaticity value of the solid portion where the printing is made with data wherein dot % is 100%.

To determine dot % taking into consideration the dot gain of C color, M color, Y color and K color, chromaticity values X, Y, Z and K are used.

Next, in step b3, dot gain quantity involved in 50% in dot % on data is determined in accordance with the following formula (4).

$$D_m = a (50\%) - 50 \quad (4)$$

The formula (4) is concerned with an equation wherein C, M, Y and K are not distinguished from one another. The dot gain quantities of C, M, Y and K, which are determined from the association N in the manner as mentioned above, are denoted by $D_{mc}$, $D_{mm}$, $D_{my}$, $D_{mk}$, respectively.

Figure 9:
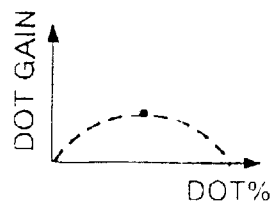
FIG. 9 is a typical illustration of a dot gain.

FIG. 9 is a typical illustration of a dot gain.

The horizontal axis denotes dot % on data, and the vertical axis denotes dot gain wherein the dot % on data is subtracted from the actual dot % on a printed mage. As seen from FIG. 9, at 0% and 100% the dot gain is 0 and at the center the dot gain offers the large value.

In steps b4 to b6, in a similar fashion to that of the steps b1 to b3, dot gain quantity is determined on each of a plurality of existing tables T (cf. step 20a of FIG. 5).

That is, in step b4, from the tables T, data on 0%, 50% and 100% of monochromatic gradation (on color axis of each of C, M, Y and K in CMYK color space) of each of C, M, Y and K are picked up. In step b5, dot % referring to the dot gain involved in 50% in dot % on data, is determined on each of C, M, Y and K in accordance with the formula (3) of Murray-Davis. In step b6, dot gain quantity D is determined on each of C, M, Y and K in accordance with the formula similar to the formula (4). The dot gain quantities of C, M, Y and K, which are determined from the tables T, are denoted by $D_{pc}$, $D_{pm}$, $D_{py}$, $D_{pk}$, respectively.

In step b7, the evaluation value α, which is composed of sums of differences between the dot gain quantities $D_{mc}$, $D_{mm}$, $D_{my}$, $D_{mk}$ determined from the association N in the steps b1 to b3 and the dot gain quantities $D_{pc}$, $D_{pm}$, $D_{py}$, $D_{pk}$ determined from the table T in the steps b4 to b6, is determined in accordance with the following formula (5).

$$\alpha = (D_{pc} - D_{mc}) + (D_{pm} - D_{mm}) + (D_{py} - D_{my}) + (D_{pk} - D_{mk}) \quad (5)$$

The evaluation value a corresponds an example of the first evaluation value referred to in the present invention.

The evaluation value a according to the formula (5) is determined on each of a plurality of existing tables T. In step b8, a table T, wherein the evaluation value α determined in the step b7 is the minimum, of the plurality of existing tables T, is selected as the table T1 (cf. step a20).

In this manner, the table wherein the dot gain is closest to a dot gain involved in the present printing condition, is selected from the existing tables T, so that a precise table T2 is produced in accordance with the flowchart of FIG. 5.

Incidentally, according to the above, while the evaluation value a is determined in accordance with the formula (5), any one is acceptable, as the evaluation value α, which can evaluate the difference between the dot gain determined from the color chart (the association N) and the dot gain determined from the tables T, and there is no need that the evaluation value a is determined always in accordance with the formula (5).

It is acceptable the evaluation value a is determined, for example, in accordance with the following formula (6).

$$\alpha = (D_{pc} - D_{mc})^2 + (D_{pm} - D_{mm})^2 + (D_{py} - D_{my})^2 + (D_{pk} + D_{mk})^2 \quad (6)$$

Further, according to the above, the evaluation value a is determined in accordance with the dot gain of a monochrome on each of CMYK, it is acceptable that dot gain on a gray axis (color axis satisfying C=M=Y) of CMYK color space where for example, K=0%) is determined, and the evaluation value a is determined in accordance with the dot gain on the gray axis.

FIG. 10 is a flowchart useful for understanding a second example of the step a20 of FIG. 5.

Here, in step c1, XYZ data is determined from the association N and the tables T on each of the combinations of 0% and 100% for CMYK, that is, 16 ways of combination of:

1: (C, M, Y, K)=(0, 0, 0, 0) 2: (C, M, Y, K)=(100, 0, 0, 0) 3: (C, M, Y, K)=(0, 100, 0, 0) 4: (C, M, Y, K)=(0, 0, 100, 0) 5: (C, M, Y, K)=(0, 0, 0, 100) 6: (C, M, Y, K)=(100, 100, 0, 0) . . . 16: (C, M, Y, K)=(100, 100, 100, 100)       (7)

Values of XYZ, which are determined from the association N, are denoted by $X_m$, $Y_m$, $Z_m$, respectively, and more specifically denoted by $X_{m1}$, $Y_{m1}$, $Z_{m1}$, $X_{m2}$, $Y_{m2}$, $Z_{m2}$, . . . applying suffixes 1 to 16 in association with CMYK data of the above 16 ways of numbers of 1 to 16.

Similarly, Values of XYZ, which are determined from the tables, are denoted by $X_p$, $Y_p$, $Z_p$, respectively, and more specifically denoted by $X_{p1}$, $Y_{p1}$, $Z_{p1}$, $X_{p2}$, $Y_{p2}$, $Z_{p2}$, . . . applying suffixes 1 to 16 in association with CMYK data of the above 16 ways of numbers of 1 to 16.

Next, in step c2, an evaluation value β, which evaluates a distance between $(X_m, Y_m, Z_m)$ and $(X_p, Y_p, Z_p)$, is determined in accordance with the following formula (8). The evaluation value β corresponds to an example of the second evaluation value referred to the present invention.

$$\beta = (X_{p1} - X_{s1})^2 + (X_{p2} - X_{m2})^2 + \ldots + (X_{p16} - X_{m16})^2$$
$$+ (Y_{p1} - Y_{s1})^2 + (Y_{p2} - Y_{m2})^2 + \ldots + (Y_{p16} - Y_{m16})^2$$
$$+ (Z_{p1} - Z_{m1})^2 + (Z_{p2} - Z_{m2})^2 + \ldots + (Z_{p16} - Z_{m16})^2 \quad (8)$$

The processing of determining XYZ values involved in the tables T in the step c1 and the arithmetic operation based on the formula (8) in the step c2 are performed on each of a plurality of existing tables T (cf. the step a20 of FIG. 5). In step c3, a table, wherein the evaluation value β is the minimum, of the plurality of existing tables T, is selected as the table T1 (cf. step a20).

In this manner, the table T, which has XYZ values close to XYZ values determined from the color chart (the association N), associated with the same CMYK data, is selected as a table T1, so that a precise new table T2 (cf. step a14 of FIG. 5) is produced using the table T1.

Incidentally, according to the above, while the evaluation value β is determined in accordance with the formula (8), any one is acceptable, as the evaluation value β, which can evaluate the distance between the coordinate points on XYZ color space determined from the color chart (the association N), associated with coordinate points on the same CMYK color space, and the coordinate points on XYZ color space determined from the tables T, and there is no need that the evaluation value β is determined always in accordance with the formula (8).

It is acceptable the evaluation value β is determined, for example, in accordance with the following formula (9).

$$\beta = \sqrt{(X_{p1} - X_{s1})^2} + \sqrt{(X_{p2} - X_{n2})^2} + \ldots + \sqrt{(X_{p16} - X_{m16})^2}$$
$$+ \sqrt{(Y_{p1} - Y_{s1})^2} + \sqrt{(Y_{p2} - Y_{n2})^2} + \ldots + \sqrt{(Y_{p15} - Y_{m16})^2}$$
$$+ \sqrt{(Z_{p1} - Z_{m1})^2} + \sqrt{(Z_{p2} - Z_{m2})^2} + \ldots + \sqrt{(Z_{p16} - Z_{m16})^2} \quad (8)$$

According to the above-mentioned second example, while there is determined the evaluation value β for evaluating the 'distance' of XYZ values on the combinations (formula (7)) of 0% and 100% in CMYK, it is acceptable that the evaluation value β is determined in accordance with the formula similar to the formula (8) or (9) on each of combinations of 0%, 50% and 100% in CMYK, instead of the combinations of 0% and 100% in CMYK, that is, the combinations as set forth below.

(C, M, Y, K)=(0, 0, 0, 0) (C, M, Y, K)=(50, 0, 0, 0) . . . (C, M, Y, K)=(100, 0, 0, 0) . . . (C, M, Y, K)=(50, 50, 0, 0) . . . (C, M, Y, K)=(50, 50, 50, 50) . . . (C, M, Y, K)=(100, 50, 50, 100) . . . (C, M, Y, K)=(100, 100, 100, 100)     (10)

Or alternatively, it is acceptable that the evaluation value β is determined in accordance with the formula similar to the formula (8) or (9) on each of combinations of 0%, 50% and 100% on each color axis of C, M, Y, K, that is, the combinations as set forth below.

(C, M, Y, K)=(0, 0, 0, 0) (C, M, Y, K)=(50, 0, 0, 0) (C, M, Y, K)=(100, 0, 0, 0) (C, M, Y, K)=(0, 50, 0, 0) (C, M, Y, K)=(0, 100, 0, 0) (C, M, Y, K)=(0, 0, 50, 0) . . . (C, M, Y, K)=(0, 0, 0, 100)     (11)

As to a color space of a printed matter, it is possible to roughly decide a degree of an approximation of color space characteristics from the comparison of XYZ values associated with CMYK data of the formula (11), that is, the comparison of gradation characteristics of monochrome, since when the gradation characteristics of monochrome is decided, the chromaticity value is determined by the characteristics in which light quantity is linear in superposition.

Or alternatively, it is acceptable to determine the evaluation value β for evaluating the 'distance' of XYZ values for CMYK data in which data (formula (11)) of 0%, 50% and 100% on the color axis of each of C, M, Y, K, and data of 50% and 100% on the color axis of C=M=Y=K, that is, data as set forth below, are combined.

$$(C, M, Y, K)=(50, 50, 50, 50) (C, M, Y, K) (100, 100, 100, 100) \quad (12)$$

In the event that color is coincident in monochrome, but the color is varied in superposition of the monochrome, it is acceptable to roughly decide a degree of an approximation of color space characteristics through determination also including four colors-superposed portion adding formulas (11) and (12).

According to the second example and the various modifications thereof, a distance between coordinate points on XYZ color space, for the same coordinate points on CMYK color space, is evaluated. It is acceptable that as the association N and the tables T, an association between CMYK data and a 'distance' on L*a*b 8 color space is defined beforehand, and to determine the evaluation value β for evaluating the 'distance', the evaluation value for evaluating the 'distance' on the L*a*b* color space is determined.

Figure 11:
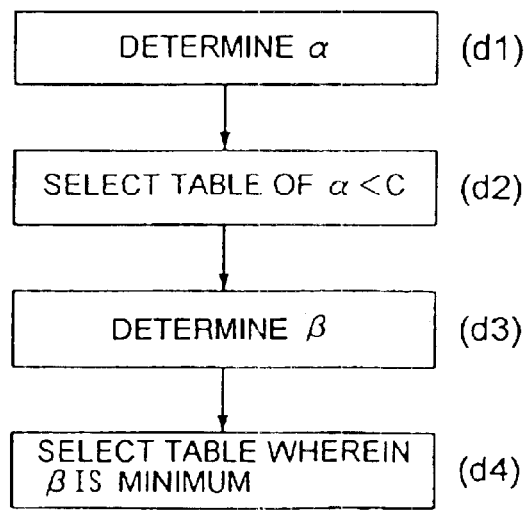
FIG. 11 is a flowchart useful for understanding a third example of step a20 of FIG. 5.

FIG. 11 is a flowchart useful for understanding a third example of the step a20 of FIG. 5.

Here, first, in step d1, an evaluation value a, which represents a difference in the dot gain as compared with the color chart (the association N) on each of a plurality of existing tables T, is determined. The step d1 corresponds to the steps b1 to b7 of FIG. 8.

When the evaluation value a is determined on each of the tables T, the process goes to a step d2 in which tables T, wherein the evaluation value α is less than a predetermined threshold C, are selected. At this stage, generally, a plurality of tables T still remain.

In step d3, there is determined the evaluation value β for evaluating the 'distance', which is explained referring to FIG. 10 with respect to the tables T selected in the step d2. The step d3 corresponds to the steps c1 to c2 of the flowchart of FIG. 10.

In step d4, a table, in which the evaluation value β determined in the step d3 is minimum, is selected as the table T1 (cf. the step a20).

In this manner, an adoption of a method that both the dot gain and the distance are evaluated to select the table T makes it possible to more surely select a table which suits one to be selected as the table T1.

Figure 12:
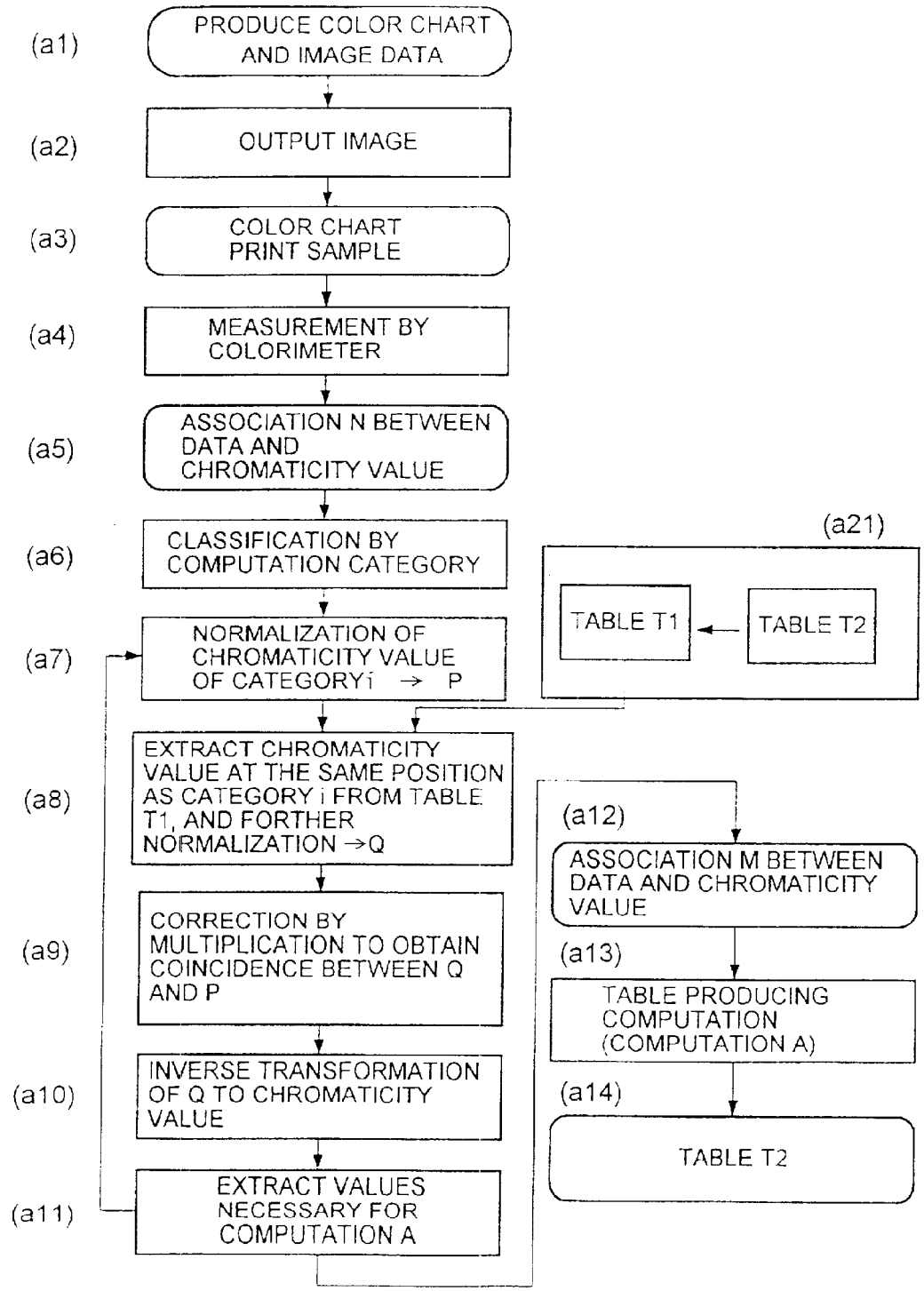
FIG. 12 is a flowchart useful for understanding an embodiment of a second profile producing method according to the present invention.

FIG. 12 is a flowchart useful for understanding an embodiment of a second profile producing method according to the present invention.

The flowchart of FIG. 12 is different from the flowchart of FIG. 5, which relates to the embodiment of the first profile producing method of the present invention, in the point that the flowchart of FIG. 12 has a step a21 instead of the step a20 of FIG. 5, and is similar to that of FIG. 5 with respect to the remaining steps a1 to a14. Accordingly, the explanation of the steps a1 to a14 of the flowchart of FIG. 12 will be omitted, and there will be explained the step a21 hereinafter.

In comparison of the flowchart of FIG. 12 with the second profile producing method of the present invention, the association N obtained in the step a5 of FIG. 12 corresponds to the color association definition referred to the second profile producing method of the present invention, and the process of the steps a1 to a5 corresponds to the color association definition obtaining process referred to the second profile producing method of the present invention. The process of the steps a6 to a10 corresponds to the curve arithmetic operation process referred to the second profile producing method of the present invention. The process of the steps a11 to a14 corresponds to the profile producing process referred to the second profile producing method of the present invention. The step a21 of FIG. 12 is concerned with a process of producing the table T1 from the table T0. According to the present embodiment, a preparation of the table T1, including that the existing table is simply selected without newly producing the table T1 from the table T0, corresponds to the profile obtaining process referred to the second profile producing method of the present invention.

Next, there will be explained an example of the profile obtaining process referred to the second profile producing method of the present invention, which is shown in the step a21 of FIG. 12.

Here, the table T0 is one of the profiles of the printing machine 20 shown in FIG. 1, which corresponds to a printing condition different from a printing condition involved in the table (the printing profile) intended now to be produced. In the event that as a candidate for the table T1, a plurality of tables exist, it is preferable to select a table of the printing condition close to the printing condition involved in the table intended now to be produced.

In the step a21 of FIG. 12, the table T1 is produced from the table T0 in the manner as set forth below.

FIGS. 13(A)–(D) are views each showing the association (x marks) between dot % on data determined from a color chart and dot % taking into consideration a dot gain, and the association (a curve) between dot % data on a table To typically shown in FIG. 12 and dot % taking into consideration a dot gain. FIGS. 14(A)–(D) are views each showing a curve after correction made in such a manner that a dot gain determined from the table is coincident with a dot gain determined from the color chart.

Cin, Min, Yin and Kin of the horizontal axis of FIGS. 13(A)–(D) denote dot % values of C, M, Y and K of CMYK data at the time of output of the color chart, respectively, and the vertical axes denote dot % values of C, M, Y and K taking into consideration the dot gain, which will be obtained in accordance with the formula (3) of Murray-Davis as mentioned above.

To determine dot % taking into consideration the dot gain, assuming that X is used as the chromaticity value, the dot % is determined in accordance with the formula (3) of Murray-Davis as mentioned above.

Here, as mentioned above, to determine dot % taking into consideration the dot gain of C color, M color, Y color and K color, chromaticity values X, Y, Z and K are used.

Dot % a is determined in accordance with the above-mentioned formula (3) and is dot % of the vertical axis.

To determine Cout at Cin=40% as shown in FIG. 13(A), for example, the dot % a is determined in such a manner that the chromatic ity value X, which is obtained through measuring the color patch produced in accordance with CMYK data of Cin=40%, Min=Yin=Kin=0, is substituted for the formula (3). Assuming that the dot % a is 50%, a mark x is plotted at the point (Cin, Cout) (40%, 50%). The similar arithmetic operation is performed on each point of the mark x.

This is similar also with respect to each of the curves of FIGS. 13(A)–(D). To explain the curve of FIG. 13(A) for example, coordinate points on C axis of the table T0 are denoted by Cin, and the associated dot gain a is determined in accordance with the formula (3) using the chromaticity value X corresponding to the associated Cin. A sum of Cin and the dot gain a is Cout. The curve shown in FIG. 13(A) is provided when the coordinate points determined by the respective Cin and Cout. This is applicable also to M, Y, K.

Here, there is performed such a correction that the curves of FIGS. 13(A)–(D) overlaps with points (marks x) determined in accordance with the color chart. That is, here, by way of example, each curve is expressed by a polynomial, and a parameter of the polynomial expression is controlled so that the curve overlaps with points determined in accordance with the color chart. The table T0 is converted into the table T1 in accordance with the curve thus obtained. For example, as shown in FIG. 14(A), in the even that the association between (C, M, Y, K)=(40%, 0%, 0%, 0%) and a certain chromaticity value XYZ is provided, the table T0 performs such an arithmetic operation that C axis is partially expanded and compressed, so that (C, M, Y, K)=(50%, 0%, 0%, 0%) is associated with the same chromaticity value XYZ. Such an arithmetic operation is performed on each of axes of C, M, Y and K. Thus, it is possible to produce a table T1. The table T1 matches a dot gain produced on the basis of the table T0 with a dot gain in the printing condition involved in the new table T2 (cf. step a14 of FIG. 12) which is intended now to be produced.

In the step a21 of FIG. 12, the existing table T0 (an example of the third profile referred to in the second profile producing method of the present invention) is obtained, and there is produced a table T1 in which a dot gain is corrected so that the dot gain of the table T0 is coincident with the dot gain determined in accordance with the color chart. To produce a table T2, there is used the table T1 in which a dot gain is corrected.

Thus, the use of the table T1 in which a dot gain is corrected makes it possible to produce the table T2 with greater accuracy.

Figure 15:
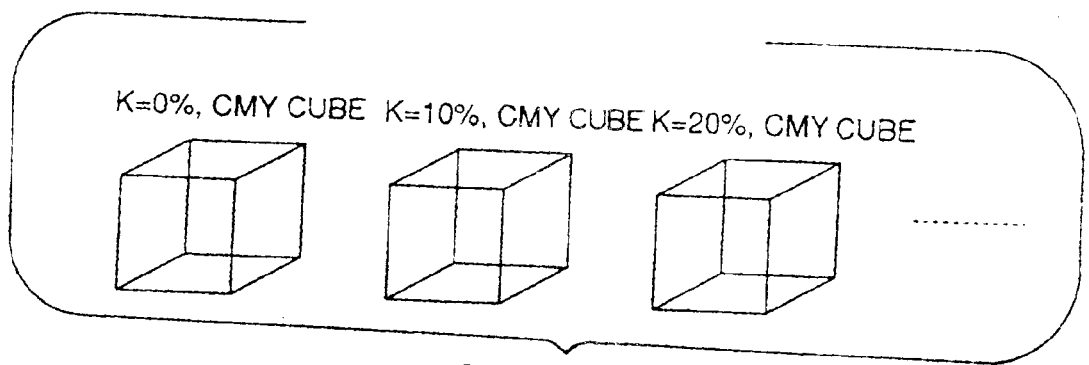
FIG. 15 is a typical illustration showing a state that CMYK space is divided into CMY sub-spaces wherein K=0%, 10%, 20%, . . . , 100%.

FIG. 15 is a typical illustration showing a state that CMYK space is divided into CMY sub-spaces wherein K=0%, 10%, 20%, . . . , 100%.

Each CMY sub-space is a three-dimensional space, and each value of CMY is expressed by 0% to 100%. Thus, an area (color reproduction area), in which the printing machine 20 (cf. FIG. 1) can reproduce a color, is represented by a cube on a three-dimensional space composed of CMY.

Figure 16:
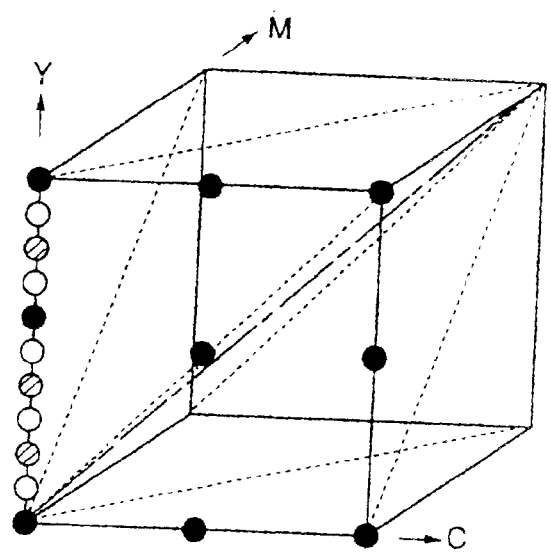
FIG. 16 is an illustration typically showing one of the cubes determined as shown in FIG. 15.

FIG. 16 is an illustration typically showing one of the cubes determined as shown in FIG. 15.

In FIG. 16, each of black dots denotes a coordinate point corresponding to the associated one of the color patches constituting a color chart, while FIG. 16 shows only part of the black dots. The coordinate points (CMYK data) for outputting the color patches are subjected to a one-point selection, for example, on each side (solid lines shown in FIG. 16) of each cube shown in FIG. 15, each diagonal (dotted lines shown in FIG. 16), both ends of each diagonal (dashed line shown in FIG. 16) inside the cube, and the middle therebetween.

In the step a6 (part (a6) of FIG. 6) of FIGS. 5 and 12, data groups aligned on those sides and diagonals are classified in form of a computation category. The black dots of the cube in FIG. 16 also denote coordinate points representative of the association N produced in the step a5 in FIG. 5. On the other hand, the association M, which is determined in the step a12 of FIG. 5 and the step e5 of FIG. 19, is represented by coordinate points represented by the black dots and hatched circles, the number of which is considerably larger than the association N, while FIG. 16 shows only Y axis. And the table, which is finally produced, is represented by coordinate points represented by the black dots and hatched circles, and in addition white circles, the number of which is further larger, while FIG. 16 shows only Y axis.

In this manner, the utilizing nonlinearity characteristics of the existing table T1 (or table T1 corrected in the dot gain of the existing table T0) makes it possible to produce the table T2 with great accuracy using a color chart composed of color patches which are less than the conventional one in the number, and also possible to greatly save the trouble up to producing the table T2.

Figure 17:
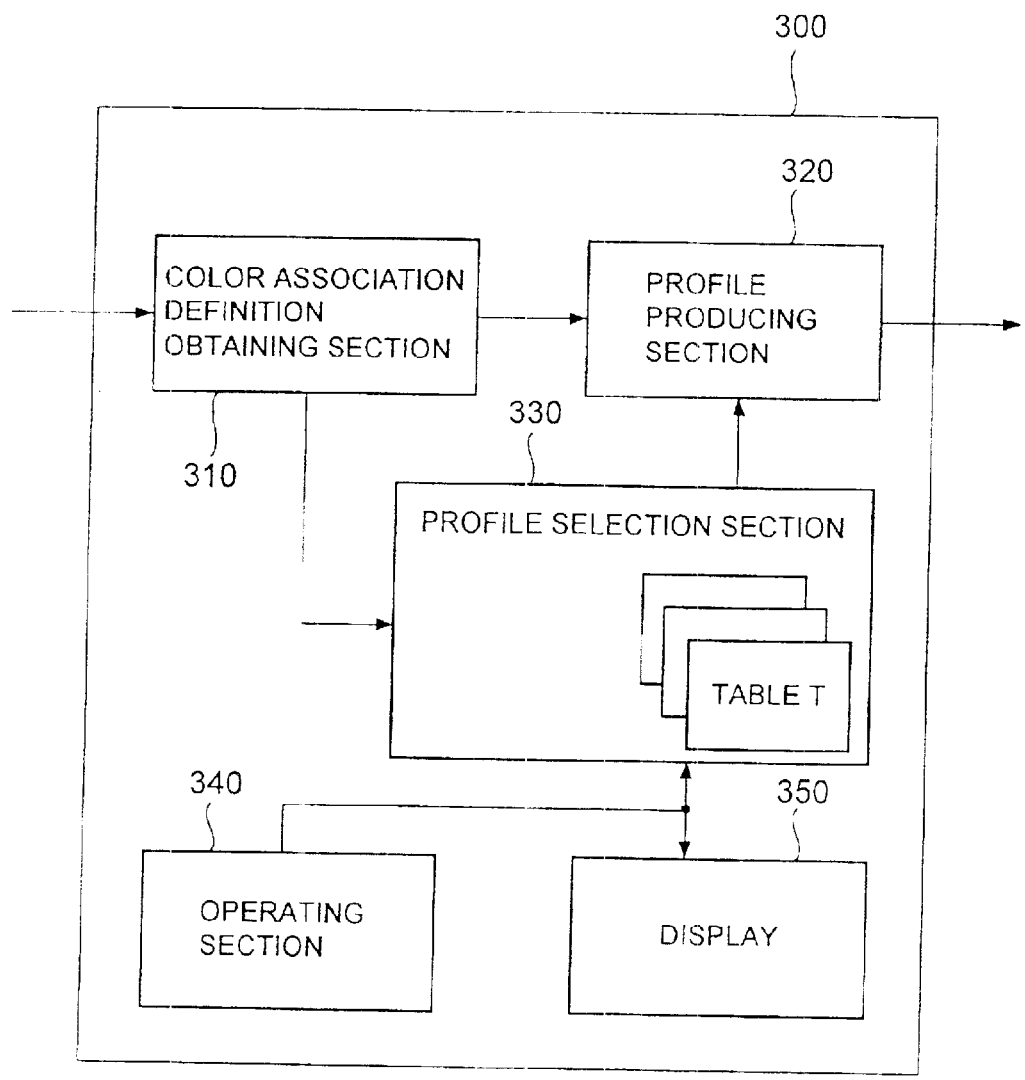
FIG. 17 is a functional block diagram of a profile producing apparatus according to the present invention.

FIG. 17 is a functional block diagram of a profile producing apparatus according to the present invention.

A profile producing apparatus 300 shown in FIG. 17 is implemented by a combination of the hardware of the personal computer 10 shown in FIGS. 3 and 4 and the software to be executed in the personal computer 10.

The profile producing apparatus 300 comprises a color association definition obtaining section 310, a profile producing section 320, a profile selection section 330, an operating section 340 and a display 350.

The color association definition obtaining section 310 inputs to the profile producing apparatus 300 a color association definition corresponding to the association N produced in the step a5 of FIG. 5. When the color association definition is transmitted through a communication, the interface 116 shown in FIG. 4 corresponds to the color association definition obtaining section 310. Alternatively in the event that an operator inputs through the keyboard 13 shown in FIG. 3 the color association definition (the association N) which is produced in the manner as explained referring to FIG. 5, the keyboard 13 corresponds to the color association definition obtaining section 310. In the event that the produced color association definition (the association N) is stored in the floppy disk 110 (cf. FIG. 4), and the color association definition stored in the floppy disk 110 is fed to the profile producing apparatus 300 (the personal computer 10), the FD drive 114 shown in FIG. 4 corresponds to the color association definition obtaining section 310.

The profile producing section 320 of the profile producing apparatus 300 of FIG. 17 corresponds to a combination of the CPU 111 shown in FIG. 4 and a program for performing an arithmetic operation corresponding to the steps a6 to a14 of FIG. 5 for profile production, which program is executed by the CPU 111.

The profile selection section 330 stores therein a plurality of existing tables T, and executes the step a20 of FIG. 5, that is, the process of any one of FIGS. 10, 11, and 12. The profile selection section 330 comprises, on a hardware, the hard disk unit 113 for storing a plurality of tables T, as shown in FIG. 4, the CPU 111 for executing processes and programs describing the process to be executed in the CPU 111.

Regarding the operating section 340, the keyboard 23 and the mouse shown in FIGS. 3 and 4 correspond, on the hardware, to the operating section 340.

Regarding the display 350, the image display unit 12 shown in FIGS. 3 and 4 correspond, on the hardware, to the display 350.

According to the profile producing apparatus 300 of FIG. 17, the profile selection section 330 selects a suitable table as a table T1 from among a plurality of existing tables in accordance with a color association definition N obtained in the color association definition obtaining section 310, and the profile producing section 320 produces a new table T2 in accordance with the color association definition N obtained in the color association definition obtaining section 310 and the table T1 selected by the profile selection section 330.

The profile producing apparatus 300 has a mode in which a table T1 is selected from among a plurality of existing tables T in accordance with an operation, as will be described later.

Figure 18:
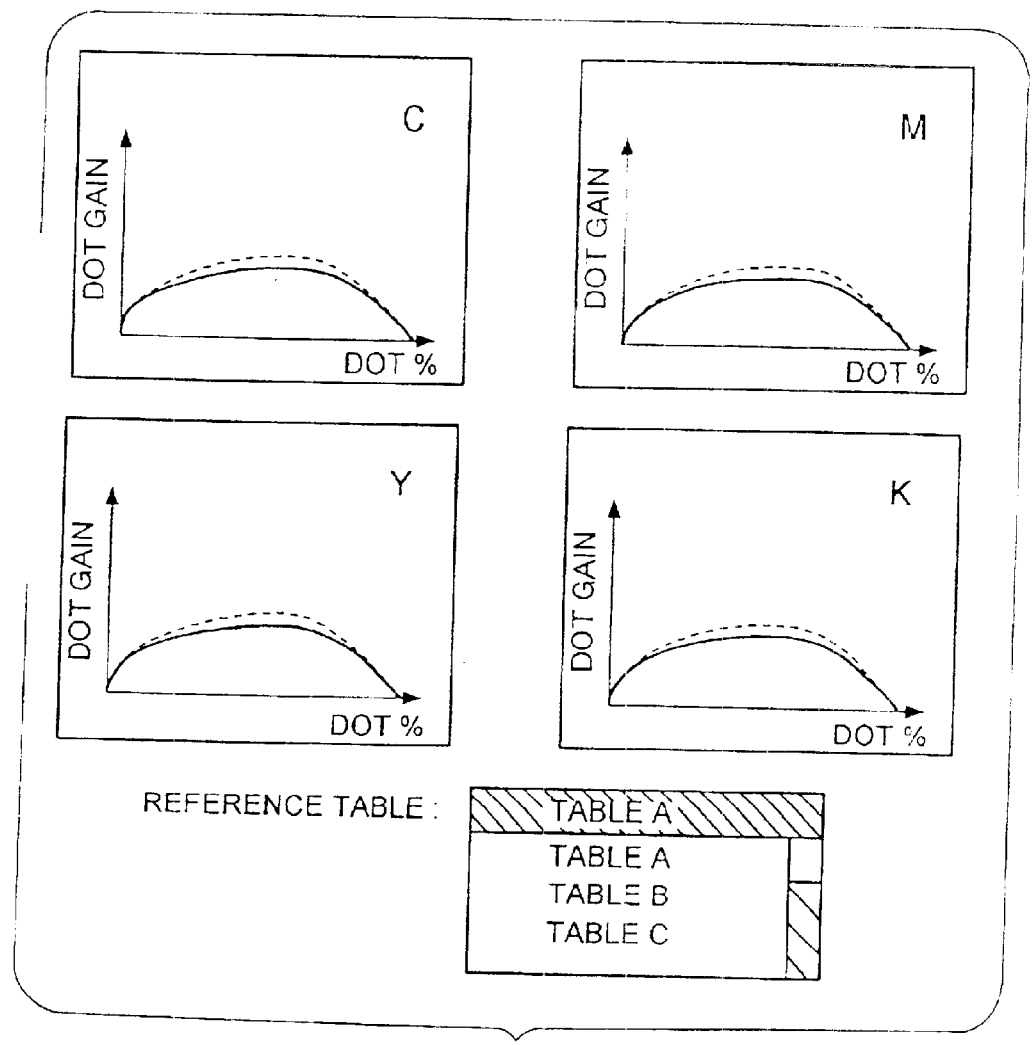
FIG. 18 is a view showing display screens displayed on a display of the profile producing apparatus.

FIG. 18 is a view showing display screens displayed on the display 350 of the profile producing apparatus 300.

FIG. 18 shows dot gain curves (solid lines) of C, M, Y and K determined from the color association definition (the association N) obtained by the color association definition obtaining section 310, and dot gain curves (dashed lines) of C, M, Y and K, which are determined from the table (here table A) selected in accordance with an operation of the operating section 340 (for example, the mouse 14 shown in FIG. 3) by an operator from among a plurality of existing tables T (tables A, B and C). When the table B or C is selected, instead of the table A, through operation of the operating section 340, the dot gain curve of the table B or C is displayed, instead of the dot gain curve of the table A.

An operator compares the dot gain curve of each of the tables A, B and C with the dot gain curve of the color association definition, so as to select through an operation of the operating section 340 a table, in which the dot gain curve is closest to the dot gain curve of the color association definition, from among the tables A, B and C.

In the profile producing apparatus 300 shown in FIG. 17, the table T1 thus selected is transmitted to the profile producing section 320 to produce a new table T2.

Thus, it is preferable that the profile producing apparatus 300 has a man-machine interface and is arranged in such a manner that information useful for a decision of an operator is displayed so that the operator can select the table T1.

According to the present embodiment, to produce the table T2 in a certain printing condition of the printing machine 20 (cf. FIG. 1), the existing table T1 is selected in the different printing condition of the same printing machine (or the existing table T0 is used). However, alternatively, it is acceptable that the table T1 is selected from among the tables produced by a different type of printing machine, similar in the printing condition for example, or the table produced by such a different type of printing machine is used as the table T0.

According to the present embodiments as mentioned above, by way of example of the output device, a printing machine is explained, but the present invention is not restricted to only a case where a profile of the printing machine is produced, and it is applicable widely to output devices.

As mentioned above, according to the present invention, it is possible to produce a profile with great accuracy saving trouble.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A profile producing method of producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing method comprising:

a color association definition obtaining step of obtaining a color association definition, in which distribution of coordinate points is relatively rough, defining an association between the first color data representative of coordinates on the first color space and the second color data representative of coordinates on the second color space;

a profile selection step of selecting a first profile from among a plurality of profiles, in which distribution of coordinate points is relatively close as compared with the color association definition obtained in said color association definition obtaining step, defining an association between the first color data representative of coordinates on the first color space and the second color data representative of coordinates on the second color space; and a profile producing step of producing a second profile defining an association between the first color data representative of coordinates on the first color space and the second color data representative of coordinates on the second color space, by correcting the first profile selected in said profile selection step in accordance with the color association definition obtained in said color association definition obtaining step, wherein said color association definition obtaining step causes said output device to output a color chart composed of a plurality of color patches associated with coordinate points more roughly distributed as compared with a distribution of the coordinate points defined in association by said first profile, on the first color space, and measures the plurality of color patches constituting the color chart outputted from said output device to determine each of the second color data representative of each of the coordinates on the second color space, on each color patch, so that a color association definition, defining an association between the first color data representative of the coordinates on the first color space, wherein a distribution of coordinate points is more rough as compared with the first profile, and the second color data representative of coordinates on the second color space, is determined.

2. A profile producing method according to claim 1, wherein the profile selection step of selecting the first profile is based on dot gain quantities of the color association definition and dot gain quantities of the plurality of the profiles.

3. A profile producing method of producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing method comprising:

a color association definition obtaining step of obtaining a color association definition, in which distribution of coordinate points is relatively rough, defining an association between the first color data representative of coordinates on the first color space and the second color data representative of coordinates on the second color space;

a profile selection step of selecting a first profile from among a plurality of profiles, in which distribution of coordinate points is relatively close as compared with the color association definition obtained in said color association definition obtaining step, defining an association between the first color data representative of coordinates on the first color space and the second color data representative of coordinates on the second color space; and a profile producing step of producing a second profile defining an association between the first color data representative of coordinates on the first color space and the second color data representative of coordinates on the second color space, by correcting the first profile selected in said profile selection step in accordance with the color association definition obtained in said color association definition obtaining step, wherein said profile selection step determines on each of the plurality of profiles a first evaluation value for evaluating a difference between a dot gain quantity of the color association definition obtained in said color association definition obtaining step and a dot gain quantity of one of the plurality of profiles, and selects one of the plurality of profiles, which is smaller in an evaluated difference, as the first profile in accordance with the first evaluation value.

4. A profile producing method of producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing method comprising:

a color association definition obtaining step of obtaining a color association definition, in which distribution of coordinate points is relatively rough, defining an association between the first color data representative of coordinates on the first color space and the second color data representative of coordinates on the second color space;

a profile selection step of selecting a first profile from among a plurality of profiles, in which distribution of coordinate points is relatively close as compared with the color association definition obtained in said color association definition obtaining step, defining an association between the first color data representative of coordinates on the first color space and the second color data representative of coordinates on the second color space; and a profile producing step of producing a second profile defining an association between the first color data representative of coordinates on the first color space and the second color data representative of coordinates on the second color space, by correcting the first profile selected in said profile selection step in accordance with the color association definition obtained in said color association definition obtaining step, wherein said profile selection step determines on each of the plurality of profiles an evaluation value for evaluating a distance between coordinate points on the second color space, which are associated with identical coordinates on the first color space in accordance with the color association definition obtained in said color association definition obtaining step and one of the plurality of profiles, and selects one of the plurality of profiles, which is smaller in an evaluated distance, as the first profile in accordance with the evaluation value.

5. A profile producing method of producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing method comprising:

a color association definition obtaining step of obtaining a color association definition, in which distribution of coordinate points is relatively rough, defining an association between the first color data representative of coordinates on the first color space and the second color data representative of coordinates on the second color space;

a profile selection step of selecting a first profile from among a plurality of profiles, in which distribution of coordinate points is relatively close as compared with the color association definition obtained in said color association definition obtaining step, defining an association between the first color data representative of coordinates on the first color space and the second color data representative of coordinates on the second color space; and a profile producing step of producing a second profile defining an association between the first color data representative of coordinates on the first color space and the second color data representative of coordinates on the second color space, by correcting the first profile selected in said profile selection step in accordance with the color association definition obtained in said color association definition obtaining step, wherein said profile selection step determines on each of the plurality of profiles a first evaluation value for evaluating a difference between a dot gain quantity of the color association definition obtained in said color association definition obtaining step and a dot gain quantity of one of the plurality of profiles, and further, said profile selection step determines on each of the plurality of profiles a second evaluation value for evaluating a distance between coordinate points on the second color space, which are associated with identical coordinates on the first color space in accordance with the color association definition obtained in said color association definition obtaining step and one of the plurality of profiles, and selects one of the plurality of profiles, which is smaller in an evaluated difference and an evaluated distance, as the first profile in accordance with both the first evaluation value and the second evaluation value.

6. A profile producing method of producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing method comprising:

a profile obtaining step of obtaining a first profile defining an association between the first color data representative of coordinates on the first color space and the second color data representative of coordinates on the second color space;

a color association definition obtaining step of causing said output device to output a color chart including a plurality of color patches associated with coordinate points more roughly distributed as compared with a distribution of the coordinate points defined in association by said first profile, on the first color space, and measuring, of the plurality of color patches constituting the color chart outputted from said output device, the plurality of color patches associated with coordinate points more roughly distributed as compared with a distribution of the coordinate points defined in association by said first profile, to determine each of the second color data representative of each of the coordinates on the second color space, on each color patch, so that a color association definition, defining an association between the first color data representative of the coordinates on the first color space, wherein a distribution of coordinate points is more rough as compared with the first profile, and the second color data representative of coordinates on the second color space, is determined;

a curve arithmetic operating step of performing on each combination of each of a plurality of color axes of the first color space and each of a plurality of color axes of the second color space an arithmetic operation for determining a curve formed through coupling relatively small number of points extracted from the color association definition, which are plotted on a plane represented by a color axis of the first color space and a color axis of the second color space, while reflecting a non-linearity of a curve consisting of a relatively large number of points extracted from the first profile, which are plotted on the plane; and a profile producing step of producing a second profile defining an association between the first color data representative of coordinates on the first color space and the second color data representative of coordinates on the second color space in accordance with an assembly of curves formed through coupling points extracted from the color association definition obtained in said color association definition obtaining step.

7. A profile producing method according to claim 6, wherein said curve arithmetic operating step modifies on said each combination the curve consisting of a relatively large number of points extracted from the first profile in such a manner that relatively small number of points extracted from the color association definition are coupled with one another in accordance with a ratio of the second color data extracted from the color association definition, which corresponds to an identical first color data, and the second color data extracted from the first profile, so that an arithmetic operation for determining a curve formed through coupling relatively small number of points to one another is executed.

8. A profile producing method according to claim 7, wherein said curve arithmetic operating step performs on said each combination a linear interpolation for the ratios associated with a plurality of first color data to determine each ratio associated with each value of the first color data, so that an arithmetic operation for moving points constituting a curve consisting of relatively large number of points extracted from the first profile is executed in accordance with the ratio.

9. A profile producing method according to claim 6, wherein said profile obtaining step determines the first profile by correcting an existing third profile defining an association between the first color data representative of coordinates on the first color space and the second color data representative of coordinates on the second color space in such a manner that a dot gain on each color axis of the first color space is coincident with a dot gain on each color axis determined in accordance with the color chart outputted from said output device.

10. A profile producing method according to claim 6, wherein said first color space is defined by color axes of four colors of cyan C, magenta M, yellow Y and black K, and said color association definition obtaining step adopts, as said color chart, a color chart composed of color patches corresponding to coordinate points not less than three points, which are designated on each axis coupling vertexes with one another of a cubic area capable of representing a color by said output device, of each sub-space where the first color space is divided into a plurality of sub-spaces defined by color axes of three colors of C, M, Y, which are associated with a plurality of discrete coordinate points on a color axis of K color, respectively, and causes said output device to output said color chart.

11. A profile producing apparatus for producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing apparatus comprising:

a color association definition obtaining section for obtaining a color association definition, in which distribution of coordinate points is relatively rough, defining an association between the first color data representative of coordinates on the first color space and the second color data representative of coordinates on the second color space;

a profile selection section for selecting a first profile from among a plurality of profiles, in which distribution of coordinate points is relatively close as compared with the color association definition obtained in said color association definition obtaining section, defining an association between the first color data representative of coordinates on the first color space and the second color data representative of coordinates on the second color space; and a profile producing section for producing a second profile defining an association between the first color data representative of coordinates on the first color space and the second color data representative of coordinates on the second color space, by correcting the first profile selected in said profile selection in accordance with the color association definition obtained in said color association definition obtaining section, wherein said color association definition obtaining section causes said output device to output a color chart composed of a plurality of color patches associated with coordinate points more roughly distributed as compared with a distribution of the coordinate points defined in association by said first profile, on the first color space, and measures the plurality of color patches constituting the color chart outputted from said output device to determine each of the second color data representative of each of the coordinates on the second color space, on each color patch, so that a color association definition, defining an association between the first color data representative of the coordinates on the first color space, wherein a distribution of coordinate points is more rough as compared with the first profile, and the second color data representative of coordinates on the second color space, is determined.

12. A profile producing apparatus for producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing apparatus comprising:

- a color association definition obtaining section for obtaining a color association definition, in which distribution of coordinate points is relatively rough, defining an association between the first color data representative of coordinates on the first color space and the second color data representative of coordinates on the second color space;
- a profile selection section for selecting a first profile from among a plurality of profiles, in which distribution of coordinate points is relatively close as compared with the color association definition obtained in said color association definition obtaining section, defining an association between the first color data representative of coordinates on the first color space and the second color data representative of coordinates on the second color space; and
- a profile producing section for producing a second profile defining an association between the first color data representative of coordinates on the first color space and the second color data representative of coordinates on the second color space, by correcting the first profile selected in said profile selection in accordance with the color association definition obtained in said color association definition obtaining section,
- wherein said profile selection section determines on each of the plurality of profiles a first evaluation value for evaluating a difference between a dot gain quantity of the color association definition obtained in said color association definition obtaining section and a dot gain quantity of one of the plurality of profiles, and selects one of the plurality of profiles, which is smaller in an evaluated difference, as the first profile in accordance with the first evaluation value.

13. A profile producing apparatus for producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing apparatus comprising:

- a color association definition obtaining section for obtaining a color association definition, in which distribution of coordinate points is relatively rough, defining an association between the first color data representative of coordinates on the first color space and the second color data representative of coordinates on the second color space;
- a profile selection section for selecting a first profile from among a plurality of profiles, in which distribution of coordinate points is relatively close as compared with the color association definition obtained in said color association definition obtaining section, defining an association between the first color data representative of coordinates on the first color space and the second color data representative of coordinates on the second color space; and
- a profile producing section for Producing a second profile defining an association between the first color data representative of coordinates on the first color space and the second color data representative of coordinates on the second color space, by correcting the first profile selected in said profile selection in accordance with the color association definition obtained in said color association definition obtaining section,
- wherein said profile selection section determines on each of the plurality of profiles an evaluation value for evaluating a distance between coordinate points on the second color space, which are associated with identical coordinates on the first color space in accordance with the color association definition obtained in said color association definition obtaining section and one of the plurality of profiles, and selects one of the plurality of profiles, which is smaller in an evaluated distance, as the first profile in accordance with the evaluation value.

14. A profile producing apparatus for producing a profile defining an association between a first color data representative of coordinates on a predetermined first color space and a second color data representative of coordinates on a second color space independent of output devices, for colors appearing on a color image outputted from an output device for outputting the color image in accordance with image data including the first color data, said profile producing apparatus comprising:

- a color association definition obtaining section for obtaining a color association definition, in which distribution of coordinate points is relatively rough, defining an association between the first color data representative of coordinates on the first color space and the second color data representative of coordinates on the second color space;
- a profile selection section for selecting a first profile from among a plurality of profiles, in which distribution of coordinate points is relatively close as compared with the color association definition obtained in said color association definition obtaining section, defining an association between the first color data representative of coordinates on the first color space and the second color data representative of coordinates on the second color space; and
- a profile producing section for producing a second profile defining an association between the first color data representative of coordinates on the first color space and the second color data representative of coordinates on the second color space, by correcting the first profile selected in said profile selection in accordance with the color association definition obtained in said color association definition obtaining section,
- wherein said profile selection section determines on each of the plurality of profiles a first evaluation value for evaluating a difference between a dot gain quantity of the color association definition obtained in said color association definition obtaining section and a dot gain quantity of one of the plurality of profiles, and further, said profile selection section determines on each of the plurality of profiles a second evaluation value for evaluating a distance between coordinate points on the second color space, which are associated with identical coordinates on the first color space in accordance with the color association definition obtained in said color association definition obtaining section and one of the plurality of profiles, and selects one of the plurality of profiles, which is smaller in an evaluated difference and an evaluated distance, as the first profile in accordance with both the first evaluation value and the second evaluation value.

15. A profile producing apparatus according to claim 11, wherein said profile selection section comprises a display for displaying a color association definition obtained by said color association definition obtaining section and a graph showing a change of dot gain quantity of said plurality of profiles, and an operating section for selecting a desired profile from among said plurality of profiles as the first profile, and wherein said profile selection section selects the first profile in accordance with an operation of said operating section.

16. A profile producing method according to claim 1, wherein said profile selection step selects the first profile according to the color association definition.

17. A profile producing method according to claim 16, wherein said profile selection step determines a difference between the color association definition and each of the plurality of profiles and selects one of the plurality of profiles having a smaller difference as the first profile.

18. A profile producing method according to claim 6, wherein said profile obtaining step determines the first profile by correcting an existing third profile defining an association between the first color data representative of coordinates on the first color space and the second color data representative of coordinates on the second color space, in accordance with dot gain values of the first color space and dot gain values of the color chart outputted from said output device.

19. A profile producing apparatus according to claim 11, wherein said profile selection section selects the first profile according to the color association definition.

20. A profile producing apparatus according to claim 19, wherein said profile selection section determines a difference between the color association definition and each of the plurality of profiles and selects one of the plurality of profiles having a smaller difference as the first profile.

21. A profile producing method according to claim 1, wherein said predetermined first color space is defined by four colors of cyan, magenta, yellow, and black, and said second color space is defined by chromaticity values of one of RGB and CIELAB.

22. A profile producing method according to claim 6, wherein said predetermined first color space is defined by four colors of cyan, magenta, yellow, and black, and said second color space is defined by chromaticity values of one of RGB and CIELAB.

23. A profile producing method according to claim 6, wherein said profile obtaining step determines the first profile by correcting an existing third profile defining an association between the first color data representative of coordinates on the first color space and the second color data representative of coordinates on the second color space, based on dot gain values of the first color space and dot gain values of the color chart outputted from said output device.

24. A profile producing apparatus according to claim 11, wherein the profile selection section selects the first profile based on dot gain quantities of the color association definition and dot gain quantities of the plurality of the profiles.

\* \* \* \* \*